(12) United States Patent
Andersen et al.

(10) Patent No.: US 8,603,432 B2
(45) Date of Patent: *Dec. 10, 2013

(54) TRANSITION METAL/ZEOLITE SCR CATALYSTS

(76) Inventors: Paul Joseph Andersen, Plymouth Meeting, PA (US); Jillian Elaine Bailie, Reading (GB); John Leonello Casci, Cleveland (GB); Hai-Ying Chen, Conshohocken, PA (US); Joseph Michael Fedeyko, West Chester, PA (US); Rodney Kok Shin Foo, Reading (GB); Raj Rao Rajaram, Slough (GB)

( * ) Notice: Subject to any disclaimer, the term of this patent is extended or adjusted under 35 U.S.C. 154(b) by 59 days.

This patent is subject to a terminal disclaimer.

(21) Appl. No.: 13/164,150

(22) Filed: Jun. 20, 2011

(65) Prior Publication Data

US 2011/0250127 A1 Oct. 13, 2011

Related U.S. Application Data

(63) Continuation of application No. 12/597,707, filed as application No. PCT/GB2008/001451 on Apr. 24, 2008, now abandoned.

(30) Foreign Application Priority Data

Apr. 26, 2007 (WO) ................ PCT/GB2007/050216

(51) Int. Cl.
*C01B 33/36* (2006.01)
*B01D 53/56* (2006.01)
*B01J 29/04* (2006.01)
*B01J 29/06* (2006.01)

(52) U.S. Cl.
USPC ............ 423/700; 423/704; 423/81; 423/210; 423/235; 423/237; 423/239.2; 502/60; 502/64

(58) Field of Classification Search
None
See application file for complete search history.

(56) References Cited

U.S. PATENT DOCUMENTS

| | | | |
|---|---|---|---|
| 3,895,094 A | 7/1975 | Carter et al. | |
| 4,210,521 A * | 7/1980 | Gorring et al. | 208/89 |
| 4,220,632 A | 9/1980 | Pence et al. | |
| 4,297,328 A | 10/1981 | Ritcher et al. | |
| 4,440,871 A | 4/1984 | Lok et al. | |
| 4,544,538 A | 10/1985 | Zones | |
| 4,567,029 A | 1/1986 | Wilson et al. | |
| 4,735,927 A | 4/1988 | Gerdes et al. | |
| 4,735,930 A | 4/1988 | Gerdes et al. | |
| 4,861,743 A | 8/1989 | Flank et al. | |
| 4,867,954 A | 9/1989 | Staniulis et al. | |
| 4,874,590 A | 10/1989 | Staniulis et al. | |
| 4,961,917 A | 10/1990 | Byrne | |
| 5,024,981 A | 6/1991 | Speronello et al. | |
| 5,041,270 A | 8/1991 | Fujitani et al. | |
| 5,096,684 A | 3/1992 | Guth et al. | |
| 5,171,553 A * | 12/1992 | Li et al. | 423/239.2 |
| 5,233,117 A | 8/1993 | Barger | |
| 5,313,792 A | 5/1994 | Katoh et al. | |
| 5,417,949 A | 5/1995 | McWilliams et al. | |
| 5,477,014 A | 12/1995 | Dunne et al. | |
| 5,516,497 A | 5/1996 | Speronello et al. | |
| 5,589,147 A * | 12/1996 | Farnos et al. | 423/239.2 |
| 5,589,149 A | 12/1996 | Garland et al. | |
| 5,884,473 A | 3/1999 | Noda et al. | |
| 5,958,370 A | 9/1999 | Zones et al. | |
| 5,958,818 A | 9/1999 | Demmel et al. | |
| 6,004,527 A * | 12/1999 | Murrell et al. | 423/712 |
| 6,139,808 A | 10/2000 | Mizuno et al. | |
| 6,162,415 A | 12/2000 | Liu et al. | |
| 6,171,556 B1 | 1/2001 | Burk et al. | |
| 6,316,683 B1 | 11/2001 | Janssen et al. | |
| 6,319,487 B1 | 11/2001 | Liu et al. | |
| 6,350,298 B1 | 2/2002 | Su et al. | |
| 6,376,562 B1 | 4/2002 | Ihm et al. | |
| 6,395,674 B1 | 5/2002 | Fung et al. | |
| 6,503,863 B2 | 1/2003 | Fung et al. | |
| 6,514,470 B1 | 2/2003 | Ott et al. | |
| 6,569,394 B2 | 5/2003 | Fischer et al. | |
| 6,576,203 B2 | 6/2003 | Abe et al. | |
| 6,606,856 B1 | 8/2003 | Brown et al. | |
| 6,685,905 B2 | 2/2004 | Mertens et al. | |

(Continued)

FOREIGN PATENT DOCUMENTS

| | | |
|---|---|---|
| DE | 10059520 | 5/2001 |
| DE | 10036476 A1 | 2/2002 |

(Continued)

OTHER PUBLICATIONS

Pelella, B.I., et al., "Enhancement of Hydrothermal Stability of Cu-ZSM5 Catalyst for NO Decomposition", Kinetis and Catalysis, vol. 47, No. 5, 2006, 728-736.

Pluth, J.J. et al., "Positions of Cations and Molecules in Zeolites with the Chabazite Framework, IV Hydrated and Dehydrated Cu2+-Exchanged Chabazite", Mat. Res. Bull, vol. 12, 1977, 1001-1007.

Qi. Gongshin et al., "Selective Catalytic Reduction of Nitric Oxide with Ammonia over ZSM-5 Based Catalysts for Diesel Engine Applications", Catal Lett 121, 2008, 111-117.

(Continued)

*Primary Examiner* — Melvin C Mayes
*Assistant Examiner* — Sheng H Davis
(74) *Attorney, Agent, or Firm* — Jimmie D. Johnson, Jr.

(57) ABSTRACT

A method of converting nitrogen oxides in a gas to nitrogen by contacting the nitrogen oxides with a nitrogenous reducing agent in the presence of a zeolite catalyst containing at least one transition metal, wherein the zeolite is a small pore zeolite containing a maximum ring size of eight tetrahedral atoms, wherein the at least one transition metal is selected from the group consisting of Cr, Mn, Fe, Co, Ce, Ni, Cu, Zn, Ga, Mo, Ru, Rh, Pd, Ag, In, Sn, Re, Ir and Pt.

14 Claims, 17 Drawing Sheets

(56) References Cited

U.S. PATENT DOCUMENTS

| | | | |
|---|---|---|---|
| 6,696,032 B2 | 2/2004 | Mertens et al. | |
| 6,709,644 B2 | 3/2004 | Zones et al. | |
| 6,974,889 B1 | 12/2005 | Verduijn et al. | |
| 7,008,610 B2 | 3/2006 | Cao et al. | |
| 7,014,827 B2 | 3/2006 | Mertens et al. | |
| 7,049,261 B2 | 5/2006 | Nam et al. | |
| 7,094,389 B2 | 8/2006 | Cao et al. | |
| 7,182,927 B2 | 2/2007 | Tran et al. | |
| 7,229,597 B2 | 6/2007 | Patchett et al. | |
| 7,264,789 B1 * | 9/2007 | Verduijn et al. | 423/716 |
| 7,601,662 B2 | 10/2009 | Bull et al. | |
| 7,722,845 B2 | 5/2010 | Caudle et al. | |
| 7,998,423 B2 | 8/2011 | Boorse et al. | |
| 7,998,443 B2 | 8/2011 | Andersen et al. | |
| 8,012,439 B2 | 9/2011 | Arnold et al. | |
| 8,017,097 B1 | 9/2011 | Southward et al. | |
| 8,119,088 B2 | 2/2012 | Boorse et al. | |
| 8,182,777 B2 | 5/2012 | Andersen et al. | |
| 8,211,393 B2 | 7/2012 | Arnold et al. | |
| 2001/0038812 A1 | 11/2001 | Yavuz et al. | |
| 2001/0043896 A1 | 11/2001 | Domesle et al. | |
| 2002/0016252 A1 | 2/2002 | Takahashi et al. | |
| 2003/0069449 A1 | 4/2003 | Zones et al. | |
| 2004/0098973 A1 | 5/2004 | Tennison et al. | |
| 2004/0166035 A1 | 8/2004 | Noda et al. | |
| 2004/0171476 A1 | 9/2004 | Nam et al. | |
| 2004/0209760 A1 | 10/2004 | Yoshikawa | |
| 2005/0031514 A1 | 2/2005 | Patchett et al. | |
| 2005/0096214 A1 | 5/2005 | Janssen et al. | |
| 2006/0039843 A1 | 2/2006 | Patchett et al. | |
| 2006/0115403 A1 | 6/2006 | Yuen | |
| 2007/0000243 A1 | 1/2007 | Liu et al. | |
| 2007/0043249 A1 | 2/2007 | Cao et al. | |
| 2007/0077189 A1 | 4/2007 | Hubig et al. | |
| 2007/0149385 A1 | 6/2007 | Liu et al. | |
| 2007/0286798 A1 | 12/2007 | Cao et al. | |
| 2008/0241060 A1 | 10/2008 | Li et al. | |
| 2008/0317999 A1 | 12/2008 | Patchett et al. | |
| 2009/0048095 A1 | 2/2009 | Li et al. | |
| 2009/0060809 A1 | 3/2009 | Shioya et al. | |
| 2010/0092362 A1 | 4/2010 | Li et al. | |
| 2010/0290963 A1 | 11/2010 | Anderson et al. | |

FOREIGN PATENT DOCUMENTS

| | | | |
|---|---|---|---|
| DE | 102004013164 A1 | 10/2005 | |
| DE | 102005010221 A1 | 9/2006 | |
| EP | 0115031 | * 12/1983 | |
| EP | 0234441 A2 | 9/1987 | |
| EP | 0299294 A2 | 1/1989 | |
| EP | 0365308 A2 | 4/1990 | |
| EP | 0396085 | 11/1990 | |
| EP | 0624393 A1 | 11/1994 | |
| EP | 0773057 | 5/1997 | |
| EP | 0950800 | 10/1999 | |
| EP | 1057519 A1 | 12/2000 | |
| EP | 1754527 A2 | 2/2007 | |
| EP | 1837489 | 9/2007 | |
| EP | 1852174 A1 | 11/2007 | |
| JP | 06048725 | 2/1994 | |
| JP | 05057194 | 9/1994 | |
| WO | 9939809 A1 | 8/1999 | |
| WO | 9956859 | 11/1999 | |
| WO | 0072965 A1 | 12/2000 | |
| WO | 0180978 A1 | 11/2001 | |
| WO | 0241991 A2 | 5/2002 | |
| WO | 03035549 | 5/2003 | |
| WO | 2004002611 A1 | 1/2004 | |
| WO | 2006064805 A1 | 6/2006 | |
| WO | 2006115665 A1 | 11/2006 | |
| WO | 2007004774 | 1/2007 | |
| WO | 2007005308 | 1/2007 | |
| WO | 2008019585 | 2/2008 | |
| WO | 2008118434 | 10/2008 | |
| WO | 2008132452 | 11/2008 | |

OTHER PUBLICATIONS

Rahkamaa-Tolonen, Katariina et al., "The effect of NO2 on the activity of fresh and aged zeolite catalysts in the NH3-SCR reaction", Catalysts Today, 100, 2005, 217-222.

Xu, Lifeng et al., "Impact of a Cu-zeolite SCR Catalyst on the Performance of a Diesel LNT+SCR System", SAE International 2009, 12 pgs.

Treacy, M. M. J., et al., "The Search for New Zeolite Frameworks", 12th International Zeolite Conference, Materials Research Society, pp. 517-532; 1998.

Parrillo et al., "Amine adsorption in H-ZSM-5," Applied Catalysis 67, 107-18 (1990).

Ishihara et al, "Cooper Ion-Exchanged SAPO-34 as a Thermostable Catalyst for Selective Reduction of NO with C3H6," Journal of Catalysis 169, 93-102 (1997).

Palella et al., "On the Hydrothermal stability of CuApso-34 microporous catalysts for N2O decomposition: a comparison with CuZSM-5," Journal of Catalysis 217, 100-06 (2003).

Long et al., "Selective Catalytic Reduction of NO with Ammonia over Fe+-Exchanged Mordenite (Fe-MOR): Catalytic Performance, Characterization, and Mechanistic Study," Journal of Catalysis 207, 274-85 (2002).

Frache et al., "CuAPSO-34 catalysts for N2O decomposition in the presence of H2O. A study of zeolitic structure stability in comparison to Cu-SAPO-34 and Cu-ZSM-5," Topics in Catalysis 22, 53-57 (2003).

Ishihara et al., "Selective Reduction of Nitrogen Monoxide with Propene over Cu-Silico-aluminophosphate (SAPO) under Oxidixing Conditions," Chemistry Letters 2119-22 (1992).

Ishihara et al., "Copper Ion Exchanged Silicoaluminophosphate (SAPO) as a Thermostable Catalyst for Selective Reduction of NOx with Hydrocarbons," Studies in Surface Science and Catalysis 84, 1493-1500 (1994).

Ishihara et al., "Thermostable Molecular Sieves, Silicoaluminophosphate (SAPO)-34, for the Removal of NOx with C3H6 in the Coexistence of O2, H2O, and SO2," Industrial & Engineering Chemistry Research 36, 17-22 (1997).

Cheng, Yisun et al., "The Effects of SO2 and SO3 Poisoning on Cu/Zeolite SCR Catalysts", SAE International 2009, 7 pages.

Fickel, Dustin W. et al., "Copper Coordination in Cu-SSZ-13 and Cu-SSZ-16 Investigated by Variable-Temperature XRD", J. Phys. Chem C, 114, 2010, 1633-1640.

Fickel, Dustin W. et al. "Investigating the High-Temperature Chemistry of Zeolites: Dehydrogenation of Zeolites and NH3-SCR of Copper Exchanged Small-Pore Zeolites", Dissertation 2010, 1-199.

"Chinese Journal of Catalysis", Thermal and Hydrothermal Stability of SAPO-34 Molecular Sieve, vol. 17, No. 6 Nov. 1996, 9 pgs.

Guyon, M., et al., "A Comparative Study of the Activity of Different Zeolitic Materials in NOx Reduction from simulated Diesel Exhausts", Catalysis and Automotive Pollution Control IV, Studies in Surface Science and Catalysis, vol. 116, 1998, pp. 297-306.

Akolekar, Deepak B. et al., "FTIR investigations of the adsorption and disproportionation of NO on Cu-exchanged silicoaluminophosphate of type 34", J. Chem. Soc., Faraday Trans., 94(1) 1998, 155-160.

Amiridis, Michael D. et al., "Selective catalytic reduction of nitric oxide by hydrocarbons", Applied Catalysis 1996, 203-227 pgs.

Ashtekar, Sunil et al., "Small-Pore Molecular Sieves SAPO-34 and SAPO-44 with Chabazite Structure: A Study of Silicon Incorporation", J. Phys. Chem. 1994, 98 1994, 4878-4883.

Ito, Masatoki et al., Structure of Aluminosilicophosphate, Acta Cryst. (1985), pp. 1698-1700.

Barger, Paul T. et al., "Hydrothermal Stability of SAPO-34 in the Methanol-to-Olefins Process", The Arabian Journal for Science and Engineering, vol. 21, No. 2 Apr. 1996, 10.

Barthomeuf, Denise, "Journal: NATO ASI Series, Series C: Mathematical and Physical Sciences Issue 444", Generation of acidity

(56) References Cited

OTHER PUBLICATIONS (amount and strength) in siliconaluminophosphates (SAPO zeolites), Examples of SAPO-5; pp. 375-390 1994, 17 pgs.

Breck, Donald W., "Zeolite Molecular Sieves", John Wiley & Sons, A Wiley-Interscience Publication 1974, 6 pgs.

Centi, G. et al., "Role of the Nature of Copper Sites in the Activity of Copper-Based Catalysts for NO Conversion", Research on Chemical Intermediates, 17 1992, 125-135 pgs.

Chen, Jiesheng et al., "Silicoaluminophosphate number eighteen (SAPO-18): a new microporous solid acid catalyst", Catalysis Letters 28 1994, 241-248.

Chung Sung Y. et al., "Effect of Si/Alratio of Mordenite and ZSM-5 type Zeolite Catalysts on Hydrothermal Stability for NO Reduction by Hydrocarbons", Studies in Surface Science Catalysis, vol. 130 2000, 1511-1516.

Dedecek, Jiri et al., "Effect of Framework Charge Density on Catalytic Activity of Copper Loaded Molecular Sieves of Chabazite Structure in Nitrogen (II) Oxide Decomposition", Collect. Czech. Chem. Commun. (vol. 65) 2000, 343-351 pgs.

Dedecek, J. et al., "Siting of the Cu+ ions in dehydrated ion exchanged synthetic and natural chabasites: a Cu+ photoluminescience study", Microporous and Mesoporous Materials 32 1999, 13 pgs.

Frache, A. et al., "Catalytic DeNOx activity of cobalt and copper ions in microporous MeALPO-34 and MeAPSO-34", Catalysis Today 75 2002, 359-365.

Frache, A. et al., "Spectroscopic characterisation of microporous aluminophosphate materials with potential application in environmental catalysis", Catalysis Today 77 2003, 371-384.

Frache, A. et al., "Synthesis, Spectroscopic and Catalytic Properties of Cobalt and Copper Ions in Aluminophosphates with Chabasite-Like Structure, Studies of the NO Reactivity", Studies in Surface Science and Catalysis 140 2001, 269-277.

Hartmann, Martin et al., "Transition-Metal Ions in Aluminophosphate and Silicoaluminophosphate Molecular Sieves: Location, Interaction with Adsorbates and Catalytic Properties", Chem. Rev. 99 (3) 1999, 635-663.

Heck, Ronald M. et al., "Catalytic Air Pollution Control", A John Wiley & Sons, Inc., Publication—Wiley-Interscience 2002 3 pgs.

Kim, Moon Hyeon, et al., "Water Tolerance of DeNOx SCR Catalysts Using Hydrocarbons: Findings, Improvements and Challenges", Korean J. Chem. Eng. 18(5) 2001, 725-740 pgs.

Kwak, Ja H. et al., "Excellent activity and selectivity of Cu-SSZ-13 in the selective catalytic reduction of NOx with NH3", Journal of Catalysis 2010, 4 pgs.

Li, Yuejin et al., "Selective NH3 Oxidation to N2 in a Wet Stream", Applied Catalysis B: Environmental 13 1997 131-139.

Lok, B. M. et al., "Silicoaluminophosphate Molecular Sieves: Another New Class of Microporous Crystalline Inorganic Solids", Journal of the American Chemical Society, vol. 106 1984, 6092-6093.

Marchese, L. et al., "ALPO-34 and SAPO-34 synthesized by using morpholine as templating agent. FTIR and FT-Raman studies of the host-guest and guest-guest interactions within the zeolitic framework", Microporous and Mesoporous Materials 30 1999, 145-153.

Medros, F. G. et al., "Dual-Catalyst System to Broaden the Window of Operability in the Reduction of NOx with Ammonia", Ind. Eng. Chem. Res. 28 1989, 1171-1177.

Miller, William R. et al., "Urea selective catalytic reduction", 2010 Factiva, Inc. 2000 9 pgs.

Misono, Makoto, "Catalytic reduction of nitrogen oxides by bifunctional catalysts", Baltzer Science Publishers vol. 2, No. 2 Dec. 1998, 24 pgs.

Prakash, A.M. et al., "Synthesis of SAPO-34: High Silicon Incorporation in the Presence of Morpholine as Template", J. Chem. Soc. Faraday Trans. 1994, 90(15) 1994, 2291-2296.

Rebrov, E. V. et al., "Development of the Kinetic Model of Platinum Catalyzed Ammonia Oxidation in a Microreactor", Chemical Engineering Journal 90 2002, 61-76.

Torre-Abreu, C. et al., "Selective Catalytic Reduction of NO on Copper-Exchanged Zeolites: The Role of the Structure of the Zeolite in the Nature of Copper-Active Sites", Catalysis Today 54 1999, 407-418.

Gies, H. et al. "Faulted Zeolite Framework Structures", Proceedings of the 12th International Zeolite Conference, Materials Research Society Conference Proceedings IV, Jul. 5-10, 1998.

Uzunova, Ellie L. et al., "Adsorption of NO on Cu-SAPO-34 and Co-SAPO-34; A Periodic DFT Study", J. Phys. Chem C 2008, 2632-2639.

Watanabe, Yoshihide et al., "Multinuclear NMR Studies on the Thermal Stability of SAPO-34", Journal of Catalysis 1993, 430-436 pgs.

Zelenka, P. et al., "Exhaust gas aftertreatment systems for diesel engines with respect to future emission legislation", Diesel Engine Technology 96 May 1993, 13 pgs.

Brandeberger, Sandro et al., "The State of the Art in Selective Catalytic Reduction of NOx by Ammonia Using Metal-Exchanged Zeolite Catalysts", Catalysis Reviews 50:4, 2008, 41 pages.

Girard, James et al., "Influence of Hydrocarbon Storage on the Durability of SCR Catalysts", SAE International, 2008 World Congress, 2008, 10 pgs.

Cavataio, Giovanni et al., "Cu/Zeolite SCR on High Porosity Filters: Laboratory and Engine Performance Evaluations", SAE International, Ford Motor Company, 2009, 10 pages.

Cavataio, Giovanni et al., "Development of Emission Transfer Functions for Predicting the Deterioratin of a Cu-Zeolite SCr Catalysts", SAE International, Ford Motor Company, 2009, 1-17.

Cavataio, Giovanni et al., "Enhanced Durability of a Cu/Zeolite Based SR Catalyst", SAE Int. J. Fuels Lubr, vol. 1, Issue 1, 2008, 477-487.

Cavataio, Giovanni et al., "Laboratory Testing of UREA-SCR Formulations to Meet Tier 2 Bin 5 Emissions", SAE International, 2007 World Congress 2007, 16 pgs.

Centi, Gabriele et al., "Nature of active species in copper-based catalysts and their chemistry of transformation of nitrogen oxides", Applied Catalysts A; General 132, 1995, 179-259.

Long, R.Q., et al., "Selective Catalytic Oxidation (SCO) of Ammonia to Nitrogen over Fe-Exchanged Zeolites", Journal of Catalysis 201, 2001, 145-152.

Chang, Russell et al., "Thermal durabiluty and deactivation of Cuzeolite SCR catalysts", Johnson Matthey, Inc., 1 pgs.

Cheng, Yisun et al., "Sulfur Tolerance and DeSOx Studies on Diesel SCR Catalysts", SAE Int. J. Fuels Lubr., vol. 1, Issue 1, 2008, 471-476.

* cited by examiner

TRANSITION METAL/ZEOLITE SCR CATALYSTS

This application is a continuation of U.S. application Ser. No. 12/597,707, filed on Oct. 26, 2009 now abandoned, the entire contents of which are fully incorporated herein by reference.

The present invention relates to a method of converting nitrogen oxides in a gas, such as an exhaust gas of a vehicular lean-burn internal combustion engine, to nitrogen by contacting the nitrogen oxides with a nitrogenous reducing agent in the presence of a transition metal-containing zeolite catalyst.

Selective catalytic reduction (SCR) of $NO_x$ by nitrogenous compounds, such as ammonia or urea, was first developed for treating industrial stationary applications. SCR technology was first used in thermal power plants in Japan in the late 1970s, and has seen widespread application in Europe since the mid-1980s. In the USA, SCR systems were introduced for gas turbines in the 1990s and have been used more recently in coal-fired powerplants. In addition to coal-fired cogeneration plants and gas turbines, SCR applications include plant and refinery heaters and boilers in the chemical processing industry, furnaces, coke ovens, municipal waste plants and incinerators. More recently, $NO_x$ reduction systems based on SCR technology are being developed for a number of vehicular (mobile) applications in Europe, Japan, and the USA, e.g. for treating diesel exhaust gas.

Several chemical reactions occur in an $NH_3$ SCR system, all of which represent desirable reactions that reduce $NO_x$ to nitrogen. The dominant reaction is represented by reaction (1).

$$4NO + 4NH_3 + O_2 \rightarrow 4N_2 + 6H_2O \tag{1}$$

Competing, non-selective reactions with oxygen can produce secondary emissions or may unproductively consume ammonia. One such non-selective reaction is the complete oxidation of ammonia, shown in reaction (2).

$$4NH_3 + 5O_2 \rightarrow 4NO + 6H_2O \tag{2}$$

Also, side reactions may lead to undesirable products such as $N_2O$, as represented by reaction (3).

$$4NH_3 + 5NO + 3O_2 \rightarrow 4N_2O + 6H_2O \tag{3}$$

Aluminosilicate zeolites are used as catalysts for SCR of $NO_x$ with $NH_3$. One application is to control $NO_x$ emissions from vehicular diesel engines, with the reductant obtainable from an ammonia precursor such as urea or by injecting ammonia per se. To promote the catalytic activity, transition metals are incorporated into the aluminosilicate zeolites. The most commonly tested transition metal zeolites are Cu/ZSM-5, Cu/Beta, Fe/ZSM-5 and Fe/Beta because they have a relatively wide temperature activity window. In general, Cu-based zeolite catalysts show better low temperature $NO_x$ reduction activity than Fe-based zeolite catalysts.

However, in use, ZSM-5 and Beta zeolites have a number of drawbacks. They are susceptible to dealumination during high temperature hydrothermal ageing resulting in a loss of acidity, especially with Cu/Beta and Cu/ZSM-5 catalysts. Both Beta- and ZSM-5-based catalysts are also affected by hydrocarbons which become adsorbed on the catalysts at relatively low temperatures and are oxidised as the temperature of the catalytic system is raised generating a significant exotherm, which can thermally damage the catalyst. This problem is particularly acute in vehicular diesel applications where significant quantities of hydrocarbon can be adsorbed on the catalyst during cold-start; and Beta and ZSM-5 zeolites are also prone to coking by hydrocarbons.

In general, Cu-based zeolite catalysts are less thermally durable, and produce higher levels of $N_2O$ than Fe-based zeolite catalysts. However, they have a desirable advantage in that they slip less ammonia in use compared with a corresponding Fe-zeolite catalyst.

It has been reported that aluminophosphate zeolites that contain transition metals demonstrate enhanced catalytic activity and superior thermal stability than aluminosilicate zeolite catalysts for SCR of $NO_x$ with hydrocarbons (also known as lean $NO_x$ catalysis or "DeNOx catalysts" (e.g. Ishihara et al., Journal of Catalysis, 169 (1997) 93)). In a similar vein, WO 2006/064805 discloses an electrical processing technology for treating diesel engine exhaust gas which utilizes corona discharge. A combination of a device for adding a $NO_x$ reducer (hydrocarbon or fuel) and a Cu-SAPO-34 $NO_x$ reducing catalyst can be disposed downstream of the electrical processing apparatus. However, to our knowledge, there has been no investigation of transition metal-containing aluminophosphate zeolites for SCR of $NO_x$ with $NH_3$ (or urea) reported in any literature to date.

WO 00/72965 discloses iron (Fe) exchanged zeolites for the selective catalytic reduction of nitrogen monoxide by ammonia for controlling $NO_x$ emissions from fossil-fuel power plants and engines. The Fe-exchanged, and optionally Fe-rare earth-exchanged, e.g. Fe—Ce-exchanged, zeolites suggested include: ZSM-5, mordenite, SAPO, clinoptilolite, chabazite, ZK-4 and ZK-5. No specific SAPO zeolites are identified and no experiment using SAPO zeolites is disclosed. Moreover, WO '965 teaches that the disclosure has application to zeolites with a range of pore sizes, i.e. large (mordenite), medium (ZSM-5, clinoptilolite) and small (chabazite, ZK-4, ZK-5) pore zeolites, with Fe-ZSM-5 preferred. There is no teaching or suggestion of any advantage in the use of small pore zeolites compared with medium and large pore zeolites. Moreover, ZK-4 zeolite is potentially hydrothermally unstable.

U.S. Pat. No. 4,735,927 discloses an extruded-type $NH_3$-SCR catalyst with stability to sulfur poisoning comprising a high surface area titanic in the form of anatase and a natural or synthetic zeolite. The zeolite must be either in the acid form or thermally convertible to the acid form in the catalytic product. Examples of suitable zeolites include mordenite, natural clinoptilolite, erionite, heulandite, ferrierite, natural faujasite or its synthetic counterpart zeolite Y, chabazite and gmelinite. A preferred zeolite is natural clinoptilolite, which may be mixed with another acid stable zeolite such as chabazite. The catalyst may optionally include small amounts (at least 0.1% by elemental weight) of a promoter in the form of precursors of vanadium oxide, copper oxide, molybdenum oxide or combinations thereof (0.2 wt % Cu and up to 1.6 wt % V are exemplified). Extruded-type catalysts are generally less durable, have lower chemical strength, require more catalyst material to achieve the same activity and are more complicated to manufacture than catalyst coatings applied to inert monolith substrates.

U.S. Pat. No. 5,417,949 also discloses an extruded-type $NH_3$-SCR catalyst comprising a zeolite having a constraint index of up to 12 and a titania binder. Intentionally, no transition metal promoter is present. ("Constraint Index" is a test to determine shape-selective catalytic behaviour in zeolites. It compares the reaction rates for the cracking of n-hexane and its isomer 3-methylpentane under competitive conditions (see V. J. Frillette et al., J Catal. 67 (1991) 218)).

U.S. Pat. No. 5,589,147 discloses an ammonia SCR catalyst comprising a molecular sieve and a metal, which catalyst can be coated on a substrate monolith. The molecular sieve useful in the invention is not limited to any particular molecular sieve material and, in general, includes all metallosilicates, metallophosphates, silicoaluminophosphates and layered and pillared layered materials. The metal is typically selected from at least one of the metals of Groups of the Periodic Table IIIA, IB, IIB, VA, VIA, VIIA, VIIIA and combinations thereof. Examples of these metals include at least one of copper, zinc, vanadium, chromium, manganese, cobalt, iron, nickel, rhodium, palladium, platinum, molybdenum, tungsten, cerium and mixtures thereof.

The disclosure of U.S. Pat. No. 5,589,147 is ambiguous about whether small pore zeolites (as defined herein) have any application in the process of the invention. For example, on the one hand, certain small pore zeolites are mentioned as possible zeolites for use in the invention, i.e. erionite and chabazite, while, among others, the molecular sieve SAPO-34 was "contemplated". On the other hand a table is presented listing Constraint Index (CI) values for some typical zeolites "including some which are suitable as catalysts in the process of this invention". The vast majority of the CI values in the table are well below 10, of which erionite (38 at 316° C.) and ZSM-34 (50 at 371° C.) are notable exceptions. However, what is clear is that intermediate pore size zeolites, e.g. those having pore sizes of from about 5 to less than 7 Angstroms, are preferred in the process of the invention. In particular, the disclosure explains that intermediate pore size zeolites are preferred because they provide constrained access to and egress from the intracrystalline free space: "The intermediate pore size zeolites . . . have an effective pore size such as to freely sorb normal hexane . . . if the only pore windows in a crystal are formed by 8-membered rings of oxygen atoms, then access to molecules of larger cross-section than normal hexane is excluded and the zeolite is not an intermediate pore size material." Only extruded Fe-ZSM-5 is exemplified.

WO 2004/002611 discloses an $NH_3$-SCR catalyst comprising a ceria-doped aluminosilicate zeolite.

U.S. Pat. No. 6,514,470 discloses a process for catalytically reducing $NO_x$ in an exhaust gas stream containing nitrogen oxides and a reductant material. The catalyst comprises an aluminum-silicate material and a metal in an amount of up to about 0.1 weight percent based on the total weight of catalyst. All of the examples use ferrierite.

Long et al. Journal of Catalysis 207 (2002) 274-285 reports on studies of $Fe^{3+}$-exchanged zeolites for selective catalytic reduction of NO with ammonia. The zeolites investigated were mordenite, clinoptilolite, Beta, ferrierite and chabazite. It was found that in the conditions studied that the SCR activity decreases in the following order: Fe-mordenite>Fe-clinoptilolite>Fe-ferrierite>Fe-Beta>Fe-chabazite. The chabazite used for making the Fe-chabazite was a naturally occurring mineral.

U.S. Pat. No. 4,961,917 discloses an $NH_3$-SCR catalyst comprising a zeolite having a silica-to-alumina ratio of at least about 10, and a pore structure which is interconnected in all three crystallographic dimensions by pores having an average kinetic pore diameter of at least about 7 Angstroms and a Cu or Fe promoter. The catalysts are said to have high activity, reduced $NH_3$ oxidation and reduced sulphur poisoning. Zeolite Beta and zeolite Y are two zeolites that meet the required definition.

U.S. Pat. No. 3,895,094 discloses an $NH_3$-SCR process using zeolite catalysts of at least 6 Angstrom intercrystalline pore size. No mention is made of exchanging the zeolites with transition metals.

U.S. Pat. No. 4,220,632 also discloses an $NH_3$-SCR process, this time using 3-10 Angstrom pore size zeolites of Na or H form.

WO 02/41991 discloses metal promoted zeolite Beta for $NH_3$-SCR, wherein the zeolite is pre-treated so as to provide it with improved hydrothermal stability.

There is a need in the art for SCR catalysts that have relatively good low temperature SCR activity, that have relatively high selectivity to $N_2$—in particular low $N_2O$ formation, that have relatively good thermal durability and are relatively resistant to hydrocarbon inhibition. We have now discovered a family of transition metal-containing zeolites that meet or contribute to this need.

According to one aspect, the invention provides a method of converting nitrogen oxides in a gas to nitrogen by contacting the nitrogen oxides with a nitrogenous reducing agent in the presence of a zeolite catalyst containing at least one transition metal, wherein the zeolite is a small pore zeolite containing a maximum ring size of eight tetrahedral atoms, wherein the at least one transition metal is selected from the group consisting of Cr, Mn, Fe, Co, Ce, Ni, Cu, Zn, Ga, Mo, Ru, Rh, Pd, Ag, In, Sn, Re, Ir and Pt.

By "zeolite catalyst containing at least one transition metal" herein we mean a zeolite structure to which has been added by ion exchange, impregnation or isomorphous substitution etc. one or more metals. "Transition metal-containing zeolite catalyst" and "zeolite catalyst containing at least one transition metal" and similar terms are used interchangeably herein.

It will be appreciated that by defining the zeolites by their Framework Type Codes we intend to include the "Type Material" and any and all isotypic framework materials. (The "Type Material" is the species first used to establish the framework type). Reference is made to Table 1, which lists a range of illustrative zeolite zeotype framework materials for use in the present invention. For the avoidance of doubt, unless otherwise made clear, reference herein to a zeolite by name, e.g. "chabazite", is to the zeolite material per se (in this example the naturally occurring type material chabazite) and not to any other material designated by the Framework Type Code to which the individual zeolite may belong, e.g. some other isotypic framework material. So for example, where the attached claims disclaim a zeolite catalyst, this disclaimer should be interpreted narrowly, so that "wherein the transition metal-containing small pore zeolite is not Cu/chabazite" is intended to exclude the type material and not any isotypic framework materials such as SAPO-34 or SSZ-13. Equally, use of a FTC herein is intended to refer to the Type Material and all isotypic framework materials defined by that FTC. For further information, we direct the reader to the website of the International Zeolite Association at www.iza-online.org.

The distinction between zeolite type materials, such as naturally occurring (i.e. mineral) chabazite, and isotypes within the same Framework Type Code is not merely arbitrary, but reflects differences in the properties between the materials, which may in turn lead to differences in activity in the method of the present invention. For example, in addition to the comments made hereinbelow with reference to Long et al. Journal of Catalysis 207 (2002) 274-285, the naturally occurring chabazite has a lower silica-to-alumina ratio than aluminosilicate isotypes such as SSZ-13, the naturally occurring chabazite has lower acidity than aluminosilicate isotypes such as SSZ-13 and the activity of the material in the method of the present invention is relatively low (see the comparison of Cu/naturally occurring chabazite with Cu/SAPO-34 in Example 13).

The zeolite catalysts for use in the present invention can be coated on a suitable substrate monolith or can be formed as extruded-type catalysts, but are preferably used in a catalyst coating.

Whilst the prior art (such as the documents discussed in the background section hereinabove) does mention a few small pore zeolites containing at least one transition metal for converting nitrogen oxides in a gas to nitrogen with a nitrogenous reducing agent, there is no appreciation in the prior art that we can find of the particular advantages of using small pore zeolites containing at least one transition metal for this purpose. Thus, the prior art suggests using large, medium and small pore zeolites containing at least one transition metal, without distinction. Accordingly, we seek to exclude any specific small pore zeolites containing at least one transition metal that have been mentioned only in this context.

In this regard, in one embodiment, the zeolite catalyst is not one of Co, Ga, Mn, In or Zn or any combination of two or more thereof/epistilbite (see U.S. Pat. No. 6,514,470). In another embodiment, the transition metal-containing small pore zeolite is not Cu/chabazite, Mo/chabazite, Cu—Mo/chabazite, Cu/erionite, Mo/erionite or Cu—Mo/erionite (see U.S. Pat. No. 4,735,927). In a further embodiment, the transition metal-containing small pore zeolite is not Ce/erionite (see WO 2004/002611). In a further embodiment, the transition metal-containing small pore zeolite is not Fe/chabazite, Fe/ZK-5, Fe/ZK-4, Fe-rare-earth/chabazite, Fe-rare-earth/ZK-5 or Fe-rare-earth/ZK-4 (see WO 00/72965). Furthermore, although WO 00/72965 discloses the use of Ce/SAPO zeolites and Ce-rare-earth/SAPO zeolites in general, it does not disclose any particular small pore SAPO zeolites with application in the present invention, such as SAPO-17, SAPO-18, SAPO-34, SAPO-35, SAPO-39, SAPO-43 and SAPO-56. In yet a further embodiment, the transition metal-containing small pore zeolite is not Fe/chabazite, (see Long et al. Journal of Catalysis 207 (2002) 274-285). Whilst, for the reasons given hereinabove, we do not believe that U.S. Pat. No. 5,589,147 discloses the use of small pore zeolites containing at least one transition metal according the method of the present invention, for safety, according to another embodiment, the zeolite catalyst is not any one of copper, zinc, chromium, manganese, cobalt, iron, nickel, rhodium, palladium, platinum, molybdenum, cerium or mixtures thereof/any one of aluminosilicate chabazite, aluminosilicate erionite, aluminosilicate ZSM-34 and SAPO-34. In another embodiment, the transition metal-containing zeolite catalyst is not LTA or Fe/CHA.

It will be appreciated that chabazite is a small pore zeolite according to the definition adopted herein and that the Long et al. paper mentioned above reports that Fe/chabazite has the poorest activity of any of the catalysts tested. Without wishing to be bound by any theory, we believe that the poor performance of the Fe/chabazite in this study is due to two principal reasons. Firstly, natural chabazite can contain basic metal cations including potassium, sodium, strontium and calcium. To obtain an active material the basic metal cations need to be exchanged for e.g. iron cations because basic metals are a known poison of zeolite acid sites. In the reported study the natural mineral is first treated with $NH_4Cl$ solution in an attempt to "flush out" the existing cations. However, we believe that one explanation for the poor reported activity is that the acidic sites in the chabazite of this study remain poisoned by basic metal cations.

Secondly, iron ions can form metal complexes (coordination compounds) with suitable ligands in the ionic exchange medium. In this regard we note that Long et al. use an aqueous $FeCl_2$ solution for ion exchange. Since the zeolite pores are relatively small, it is possible that a bulky co-ordination compound may not be able to gain access to the active sites located in the pores.

It will be appreciated, e.g. from Table 1 hereinbelow that by "MeAPSO" and "MeAlPO" we intend zeotypes substituted with one or more metals. Suitable substituent metals include one or more of, without limitation, As, B, Be, Co, Fe, Ga, Ge, Li, Mg, Mn, Zn and Zr.

In a particular embodiment, the small pore zeolites for use in the present invention can be selected from the group consisting of aluminosilicate zeolites, metal-substituted aluminosilicate zeolites and aluminophosphate zeolites.

Aluminophosphate zeolites with application in the present invention include aluminophosphate (AlPO) zeolites, metal substituted zeolites (MeAlPO) zeolites, silico-aluminophosphate (SAPO) zeolites and metal substituted silico-aluminophosphate (MeAPSO) zeolites.

It will be appreciated that the invention extends to catalyst coatings and extruded-type substrate monoliths comprising both transition metal-containing small pore zeolites according to the invention and non-small pore zeolites (whether metallised or not) such as medium-, large- and meso-pore zeolites (whether containing transition metal(s) or not) because such a combination also obtains the advantages of using small pore zeolites per se. It should also be understood that the catalyst coatings and extruded-type substrate monoliths for use in the invention can comprise combinations of two or more transition metal-containing small pore zeolites. Furthermore, each small pore zeolite in such a combination can contain one or more transition metals, each being selected from the group defined hereinabove, e.g. a first small pore zeolite can contain both Cu and Fe and a second small pore zeolite in combination with the first small pore zeolite can contain Ce.

In this invention, we have discovered that transition metal-containing small pore zeolites are advantageous catalysts for SCR of NO with $NH_3$. Compared to transition metal-containing medium, large or meso-pore zeolite catalysts, transition metal-containing small pore zeolite catalysts demonstrate significantly improved $NO_x$ reduction activity, especially at low temperatures. They also exhibit high selectivity to $N_2$ (e.g. low $N_2O$ formation) and good hydrothermal stability. Furthermore, small pore zeolites containing at least one transition metal are more resistant to hydrocarbon inhibition than larger pore zeolites, e.g. a medium pore zeolite (a zeolite containing a maximum ring size of 10) such as ZSM-5 or a large pore zeolite (a zeolite having a maximum ring size of 12), such as Beta. Small pore aluminophosphate zeolites for use in the present invention include SAPO-17, SAPO-18, SAPO-34, SAPO-35, SAPO-39, SAPO-43 and SAPO-56.

In one embodiment, the small pore zeolite is selected from the group of Framework Type Codes consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON.

Zeolites with application in the present invention can include those that have been treated to improve hydrothermal stability. Illustrative methods of improving hydrothermal stability include: (i) Dealumination by: steaming and acid extraction using an acid or complexing agent e.g. (EDTA—ethylenediaminetetracetic acid); treatment with acid and/or complexing agent; treatment with a gaseous stream of $SiCl_4$ (replaces Al in the zeolite framework with Si); (ii) Cation exchange—use of multi-valent cations such as La; and (iii) Use of phosphorus containing compounds (see e.g. U.S. Pat. No. 5,958,818).

We believe that small pore zeolites may minimise the detrimental effect of hydrocarbons by means of a molecular sieving effect, whereby the small pore zeolite allows NO and $NH_3$ to diffuse to the active sites inside the pores but that the diffusion of hydrocarbon molecules is restricted. In this regard, the kinetic diameter of both NO (3.16 Å) and $NH_3$ (2.6 Å) is smaller than those of the typical hydrocarbons ($C_3H_6$~4.5 Å, n-$C_8H_{18}$~4.30 Å and $C_7H_8$~6.0 Å) present in, for example, diesel engine exhaust. Accordingly, in one embodiment the small pore zeolite catalysts for use in the present invention have a pore size in at least one dimension of less than 4.3 Å. Illustrative examples of suitable small pore zeolites are set out in Table 1.

TABLE 1

Details of small pore zeolites with application in the present invention

| Zeolite Framework Type (by Framework Type Code) | Type material* and illustrative isotypic framework structures | Dimensionality | Pore size (Å) | Additional info |
|---|---|---|---|---|
| ACO | *ACP-1 | 3D | 3.5 × 2.8, 3.5 × 3.5 | Ring sizes - 8, 4 |
| AEI | *AlPO-18 | 3D | 3.8 × 3.8 | Ring sizes - 8, 6, 4 |
|  | [Co—Al—P—O]-AEI SAPO-18 SIZ-8 SSZ-39 |  |  |  |
| AEN | *AlPO-EN3 | 2D | 4.3 × 3.1, 2.7 × 5.0 | Ring sizes - 8, 6, 4 |
|  | AlPO-53(A) AlPO-53(B) [Ga—P—O]-AEN CFSAPO-1A CoIST-2 IST-2 JDF-2 MCS-1 MnAPO-14 Mu-10 UiO-12-500 UiO-12-as |  |  |  |
| AFN | *AlPO-14 | 3D | 1.9 × 4.6, 2.1 × 4.9, 3.3 × 4.0 | Ring sizes - 8, 6, 4 |
|  | |($C_3N_2H_{12}$)—|[Mn—Al—P—O]-AFN GaPO-14 |  |  |  |
| AFT | *AlPO-52 | 3D | 3.8 × 3.2, 3.8 × 3.6 | Ring sizes - 8, 6, 4 |
| AFX | *SAPO-56 | 3D | 3.4 × 3.6 | Ring sizes - 8, 6, 4 |
|  | MAPSO-56, M = Co, Mn, Zr SSZ-16 |  |  |  |
| ANA | *Analcime | 3D | 4.2 × 1.6 | Ring sizes - 8, 6, 4 |
|  | $AlPO_4$-pollucite AlPO-24 Ammonioleucite [Al—Co—P—O]-ANA [Al—Si—P—O]-ANA |Cs—|[Al—Ge—O]-ANA |Cs—|[Be—Si—O]-ANA |$Cs_{16}$|[$Cu_8Si_{40}O_{96}$]-ANA |Cs—Fe|[Si—O]-ANA |Cs—Na—($H_2O$)|[Ga—Si—O]-ANA [Ga—Ge—O]-ANA |K—|[B—Si—O]-ANA |K—|[Be—B—P—O]-ANA |Li—|[Li—Zn—Si—O]-ANA |Li—Na|[Al—Si—O]-ANA |Na—|[Be—B—P—O]-ANA |($NH_4$)—|[Be—B—P—O]-ANA |($NH_4$)—|[Zn—Ga—P—O]-ANA [Zn—As—O]-ANA Ca-D Hsianghualite Leucite |  |  |  |

TABLE 1-continued

Details of small pore zeolites with application in the present invention

| Zeolite Framework Type (by Framework Type Code) | Type material* and illustrative isotypic framework structures | Dimensionality | Pore size (Å) | Additional info |
|---|---|---|---|---|
| | Na—B<br>Pollucite<br>Wairakite | | | |
| APC | *AlPO—C | 2D | 3.7 × 3.4, 4.7 × 2.0 | Ring sizes - 8, 6, 4 |
| | AlPO—H3<br>CoAPO-H3 | | | |
| APD | *AlPO-D | 2D | 6.0 × 2.3, 5.8 × 1.3 | Ring sizes - 8, 6, 4 |
| | APO-CJ3 | | | |
| ATT | *AlPO-12-TAMU | 2D | 4.6 × 4.2, 3.8 × 3.8 | Ring sizes - 8, 6, 4 |
| | AlPO-33<br>RMA-3 | | | |
| CDO | *CDS-1 | 2D | 4.7 × 3.1, 4.2 × 2.5 | Ring sizes - 8, 5 |
| | MCM-65<br>UZM-25 | | | |
| CHA | *Chabazite | 3D | 3.8 × 3.8 | Ring sizes - 8, 6, 4 |
| | AlPO-34<br>[Al—As—O]-CHA<br>[Al—Co—P—O]-CHA<br>|Co| [Be—P—O]-CHA<br>|Co$_3$ (C$_6$N$_4$H$_{24}$)$_3$ (H$_2$O)$_9$| [Be$_{18}$P$_{18}$O$_{72}$]-CHA<br>[Co—Al—P—O]-CHA<br>|Li—Na| [Al—Si—O]-CHA<br>[Mg—Al—P—O]-CHA<br>[Si—O]-CHA<br>[Zn—Al—P—O]-CHA<br>[Zn—As—O]-CHA<br>CoAPO-44<br>CoAPO-47<br>DAF-5<br>GaPO-34<br>K-Chabazite<br>Linde D<br>Linde R<br>LZ-218<br>MeAPO-47<br>MeAPSO-47<br>(Ni(deta)$_2$)-UT-6<br>Phi<br>SAPO-34<br>SAPO-47<br>SSZ-13<br>UiO-21<br>Willhendersonite<br>ZK-14<br>ZYT-6 | | | |
| DDR | *Deca-dodecasil 3R | 2D | 4.4 × 3.6 | Ring sizes - 8, 6, 5, 4 |
| | [B—Si—O]-DDR<br>Sigma-1<br>ZSM-58 | | | |
| DFT | *DAF-2 | 3D | 4.1 × 4.1, 4.7 × 1.8 | Ring sizes - 8, 6, 4 |
| | ACP-3, [Co—Al—P—O]-DFT<br>[Fe—Zn—P—O]-DFT<br>[Zn—Co—P—O]-DFT<br>UCSB-3GaGe<br>UCSB-3ZnAs<br>UiO-20, [Mg—P—O]-DFT | | | |
| EAB | *TMA-E | 2D | 5.1 × 3.7 | Ring sizes - 8, 6, 4 |
| | Bellbergite | | | |

TABLE 1-continued

Details of small pore zeolites with application in the present invention

| Zeolite Framework Type (by Framework Type Code) | Type material* and illustrative isotypic framework structures | Dimension-ality | Pore size (Å) | Additional info |
|---|---|---|---|---|
| EDI | *Edingtonite | 3D | 2.8 × 3.8, 3.1 × 2.0 | Ring sizes - 8, 4 |
|  | \|(C$_3$H$_{12}$N$_2$)$_{2.5}$\| [Zn$_5$P$_5$O$_{20}$]-EDI [Co—Al—P—O]-EDI [Co—Ga—P—O]-EDI \|Li—\|[Al—Si—O]-EDI \|Rb$_7$ Na (H$_2$O)$_3$\| [Ga$_8$Si$_{12}$O$_{40}$]-EDI [Zn—As—O]-EDI K—F Linde F Zeolite N |  |  |  |
| EPI | *Epistilbite | 2D | 4.5 × 3.7, 3.6 × 3.6 | Ring sizes - 8, 4 |
| ERI | *Erionite | 3D | 3.6 × 5.1 | Ring sizes - 8, 6, 4 |
|  | AlPO-17 Linde T LZ-220 SAPO-17 ZSM-34 |  |  |  |
| GIS | *Gismondine | 3D | 4.5 × 3.1, 4.8 × 2.8 | Ring sizes - 8, 4 |
|  | Amicite [Al—Co—P—O]-GIS [Al—Ge—O]-GIS [Al—P—O]-GIS [Be—P—O]-GIS \|(C$_3$H$_{12}$N$_2$)$_4$\| [Be$_8$P$_8$O$_{32}$]-GIS \|(C$_3$H$_{12}$N$_2$)$_4$\| [Zn$_8$P$_8$O$_{32}$]-GIS [Co—Al—P—O]-GIS [Co—Ga—P—O]-GIS [Co—P—O]-GIS \|Cs$_4$\|[Zn$_4$B$_4$P$_8$O$_{32}$]-GIS [Ga—Si—O]-GIS [Mg—Al—P—O]-GIS \|(NH$_4$)$_4$\|[Zn$_4$B$_4$P$_8$O$_{32}$]-GIS \|Rb$_4$\|[Zn$_4$B$_4$P$_8$O$_{32}$]-GIS [Zn—Al—As—O]-GIS [Zn—Co—B—P—O]-GIS [Zn—Ga—As—O]-GIS [Zn—Ga—P—O]-GIS Garronite Gobbinsite MAPO-43 MAPSO-43 Na-P1 Na-P2 SAPO-43 TMA-gismondine |  |  |  |
| GOO | *Goosecreekite | 3D | 2.8 × 4.0, 2.7 × 4.1, 4.7 × 2.9 | Ring sizes - 8, 6, 4 |
| IHW | *ITQ-32 | 2D | 3.5 × 4.3 | Ring sizes - 8, 6, 5, 4 |
| ITE | *ITQ-3 | 2D | 4.3 × 3.8, 2.7 × 5.8 | Ring sizes - 8, 6, 5, 4 |
|  | Mu-14 SSZ-36 |  |  |  |
| ITW | *ITQ-12 | 2D | 5.4 × 2.4, 3.9 × 4.2 | Ring sizes - 8, 6, 5, 4 |
| LEV | *Levyne | 2D | 3.6 × 4.8 | Ring sizes - 8, 6, 4 |
|  | AlPO-35 CoDAF-4 LZ-132 NU-3 |  |  |  |

TABLE 1-continued

Details of small pore zeolites with application in the present invention

| Zeolite Framework Type (by Framework Type Code) | Type material* and illustrative isotypic framework structures | Dimensionality | Pore size (Å) | Additional info |
|---|---|---|---|---|
| | RUB-1 [B—Si—O]-LEV<br>SAPO-35<br>ZK-20<br>ZnAPO-35 | | | |
| KFI | ZK-5 | 3D | 3.9 × 3.9 | Ring sizes - 8, 6, 4 |
| | \|18-crown-6\|[Al—Si—O]-KFI<br>[Zn—Ga—As—O]-KFI<br>(Cs,K)-ZK-5<br>P<br>Q | | | |
| MER | *Merlinoite | 3D | 3.5 × 3.1, 3.6 × 2.7, 5.1 × 3.4, 3.3 × 3.3 | Ring sizes - 8, 4 |
| | [Al—Co—P—O]-MER<br>\|Ba—\|[Al—Si—O]-MER<br>\|Ba—Cl—\|[Al—Si—O]-MER<br>[Ga—Al—Si—O]-MER<br>\|K—\|[Al—Si—O]-MER<br>\|NH$_4$—\|[Be—P—O]-MER<br>K-M<br>Linde W<br>Zeolite W | | | |
| MON | *Montesommaite | 2D | 4.4 × 3.2, 3.6 × 3.6 | Ring sizes - 8, 5, 4 |
| | [Al—Ge—O]-MON | | | |
| NSI | *Nu-6(2) | 2D | 2.6 × 4.5, 2.4 × 4.8 | Ring sizes - 8, 6, 5 |
| | EU-20 | | | |
| OWE | *UiO-28 | 2D | 4.0 × 3.5, 4.8 × 3.2 | Ring sizes - 8, 6, 4 |
| | ACP-2 | | | |
| PAU | *Paulingite | 3D | 3.6 × 3.6 | Ring sizes - 8, 6, 4 |
| | [Ga—Si—O]-PAU<br>ECR-18 | | | |
| PHI | *Phillipsite | 3D | 3.8 × 3.8, 3.0 × 4.3, 3.3 × 3.2 | Ring sizes - 8, 4 |
| | [Al—Co—P—O]-PHI<br>DAF-8<br>Harmotome<br>Wellsite<br>ZK-19 | | | |
| RHO | *Rho | 3D | 3.6 × 3.6 | Ring sizes - 8, 6, 4 |
| | [Be—As—O]-RHO<br>[Be—P—O]-RHO<br>[Co—Al—P—O]-RHO<br>\|H—\|[Al—Si—O]-RHO<br>[Mg—Al—P—O]-RHO<br>[Mn—Al—P—O]-RHO<br>\|Na$_{16}$Cs$_8$\|[Al$_{24}$Ge$_{24}$O$_{96}$]-RHO<br>\|NH$_4$—\|[Al—Si—O]-RHO<br>\|Rb—\|[Be—As—O]-RHO<br>Gallosilicate ECR-10<br>LZ-214<br>Pahasapaite | | | |
| RTH | *RUB-13 | 2D | 4.1 × 3.8, 5.6 × 2.5 | Ring sizes - 8, 6, 5, 4 |
| | SSZ-36<br>SSZ-50 | | | |
| SAT | *STA-2 | 3D | 5.5 × 3.0 | Ring sizes - 8, 6, 4 |
| SAV | *Mg-STA-7 | 3D | 3.8 × 3.8, 3.9 × 3.9 | Ring sizes - 8, 6, 4 |
| | Co-STA-7<br>Zn-STA-7 | | | |

TABLE 1-continued

Details of small pore zeolites with application in the present invention

| Zeolite Framework Type (by Framework Type Code) | Type material* and illustrative isotypic framework structures | Dimensionality | Pore size (Å) | Additional info |
|---|---|---|---|---|
| SBN | *UCSB-9<br>SU-46 | 3D | TBC | Ring sizes - 8, 4, 3 |
| SIV | *SIZ-7 | 3D | 3.5 × 3.9, 3.7 × 3.8, 3.8 × 3.9 | Ring sizes - 8, 4 |
| THO | *Thomsonite<br>[Al—Co—P—O]-THO<br>[Ga—Co—P—O]-THO<br>\|Rb$_{20}$\|[Ga$_{20}$Ge$_{20}$O$_{80}$]-THO<br>[Zn—Al—As—O]-THO<br>[Zn—P—O]-THO<br>[Ga—Si—O]-THO)<br>[Zn—Co—P—O]-THO | 3D | 2.3 × 3.9, 4.0 × 2.2, 3.0 × 2.2 | Ring sizes - 8, 4 |
| TSC | *Tschörtnerite | 3D | 4.2 × 4.2, 5.6 × 3.1 | Ring sizes - 8, 6, 4 |
| UEI | *Mu-18 | 2D | 3.5 × 4.6, 3.6 × 2.5 | Ring sizes - 8, 6, 4 |
| UFI | *UZM-5 | 2D | 3.6 × 4.4, 3.2 × 3.2 (cage) | Ring sizes - 8, 6, 4 |
| VNI | *VPI-9 | 3D | 3.5 × 3.6, 3.1 × 4.0 | Ring sizes - 8, 5, 4, 3 |
| YUG | *Yugawaralite<br>Sr-Q | 2D | 2.8 × 3.6, 3.1 × 5.0 | Ring sizes - 8, 5, 4 |
| ZON | *ZAPO-M1<br>GaPO-DAB-2<br>UiO-7 | 2D | 2.5 × 5.1, 3.7 × 4.4 | Ring sizes - 8, 6, 4 |

Small pore zeolites with particular application for treating NO$_x$ in exhaust gases of lean-burn internal combustion engines, e.g. vehicular exhaust gases are set out in Table 2.

TABLE 2

Preferred small pore zeolites for use in treating exhaust gases of lean-burn internal combustion engines.

| Structure | Zeolite |
|---|---|
| CHA | SAPO-34 |
|  | AlPO-34 |
|  | SSZ-13 |
| LEV | Levynite |
|  | Nu-3 |
|  | LZ-132 |
|  | SAPO-35 |
|  | ZK-20 |
| ERI | Erionite |
|  | ZSM-34 |
|  | Linde type T |
| DDR | Deca-dodecasil 3R |
|  | Sigma-1 |
| KFI | ZK-5 |
|  | 18-crown-6 |
|  | [Zn—Ga—As—O]-KFI |
| EAB | TMA-E |
| PAU | ECR-18 |
| MER | Merlinoite |
| AEI | SSZ-39 |
| GOO | Goosecreekite |
| YUG | Yugawaralite |
| GIS | P1 |
| VNI | VPI-9 |

Small pore aluminosilicate zeolites for use in the present invention can have a silica-to-alumina ratio (SAR) of from 2 to 300, optionally 4 to 200 and preferably 8 to 150. It will be appreciated that higher SAR ratios are preferred to improve thermal stability but this may negatively affect transition metal exchange. Therefore, in selecting preferred materials consideration can be given to SAR so that a balance may be struck between these two properties.

The gas containing the nitrogen oxides can contact the zeolite catalyst at a gas hourly space velocity of from 5,000 hr$^{-1}$ to 500,000 hr$^{-1}$, optionally from 10,000 hr$^{-1}$ to 200,000 hr$^{-1}$.

In one embodiment, the small pore zeolites for use in the present invention do not include aluminophosphate zeolites as defined herein. In a further embodiment, the small pore zeolites (as defined herein) for use in the present invention are restricted to aluminophosphate zeolites (as defined herein). In a further embodiment, small pore zeolites for use in the present invention are aluminosilicate zeolites and metal substituted aluminosilicate zeolites (and not aluminophosphate zeolites as defined herein).

Small pore zeolites for use in the invention can have three-dimensional dimensionality, i.e. a pore structure which is interconnected in all three crystallographic dimensions, or two-dimensional dimensionality. In one embodiment, the small pore zeolites for use in the present invention consist of zeolites having three-dimensional dimensionality. In another embodiment, the small pore zeolites for use in the present invention consist of zeolites having two-dimensional dimensionality.

In one embodiment, the at least one transition metal is selected from the group consisting of Cr, Ce, Mn, Fe, Co, Ni and Cu. In a preferred embodiment, the at least one transition metal is selected from the group consisting of Cu, Fe and Ce.

In a particular embodiment, the at least one transition metal consists of Cu. In another particular embodiment, the at least one transition metal consists of Fe. In a further particular embodiment, the at least one transition metal is Cu and/or Fe.

The total of the at least one transition metal that can be included in the at least one transition metal-containing zeolite can be from 0.01 to 20 wt %, based on the total weight of the zeolite catalyst containing at least one transition metal. In one embodiment, the total of the at least one transition metal that can be included can be from 0.1 to 10 wt %. In a particular embodiment, the total of the at least one transition metal that can be included is from 0.5 to 5 wt %.

A preferred transition metal-containing two dimensional small pore zeolite for use in the present invention consists of Cu/LEV, such as Cu/Nu-3, whereas a preferred transition metal-containing three dimensional small pore zeolite/aluminophosphate zeolite for use in the present invention consists of Cu/CHA, such as Cu/SAPO-34 or Cu/SSZ-13. In another embodiment, particularly where a ratio of $NO/NO_2$ is adjusted, e.g. by using a suitable oxidation catalyst (see hereinbelow) to about 1:1, Fe-containing zeolite catalysts are preferred, such as Fe-CHA, e.g. Fe/SAPO-34 or Fe/SSZ-13. Preliminary analysis indicates that Cu/SSZ-13 and Cu/Nu-3 are more resistant than the equivalent Cu/SAPO-34 to extended severe high temperature lean hydrothermal ageing (900° C. for 3 hours in 4.5% $H_2O$/air mixture cf. Example 4).

The at least one transition metal can be included in the zeolite by any feasible method. For example, it can be added after the zeolite has been synthesised, e.g. by incipient wetness or exchange process; or the at least one metal can be added during zeolite synthesis.

The zeolite catalyst for use in the present invention can be coated, e.g. as a washcoat component, on a suitable monolith substrate, such as a metal or ceramic flow through monolith substrate or a filtering substrate, such as a wall-flow filter or sintered metal or partial filter (such as is disclosed in WO 01/80978 or EP 1057519, the latter document describing a substrate comprising convoluted flow paths that at least slows the passage of soot therethrough). Alternatively, the zeolites for use in the present invention can be synthesized directly onto the substrate. Alternatively, the zeolite catalysts according to the invention can be formed into an extruded-type flow through catalyst.

The small pore zeolite catalyst containing at least one transition metal for use in the present invention is coated on a suitable monolith substrate. Washcoat compositions containing the zeolites for use in the present invention for coating onto the monolith substrate for manufacturing extruded type substrate monoliths can comprise a binder selected from the group consisting of alumina, silica, (non zeolite) silica-alumina, naturally occurring clays, $TiO_2$, $ZrO_2$, and $SnO_2$.

In one embodiment, the nitrogen oxides are reduced with the reducing agent at a temperature of at least 100° C. In another embodiment, the nitrogen oxides are reduced with the reducing agent at a temperature from about 150° C. to 750° C. The latter embodiment is particularly useful for treating exhaust gases from heavy and light duty diesel engines, particularly engines comprising exhaust systems comprising (optionally catalysed) diesel particulate filters which are regenerated actively, e.g. by injecting hydrocarbon into the exhaust system upstream of the filter, wherein the zeolite catalyst for use in the present invention is located downstream of the filter.

In a particular embodiment, the temperature range is from 175 to 550° C. In another embodiment, the temperature range is from 175 to 400° C.

In another embodiment, the nitrogen oxides reduction is carried out in the presence of oxygen. In an alternative embodiment, the nitrogen oxides reduction is carried out in the absence of oxygen.

Zeolites for use in the present application include natural and synthetic zeolites, preferably synthetic zeolites because the zeolites can have a more uniform: silica-to-alumina ratio (SAR), crystallite size, crystallite morphology, and the absence of impurities (e.g. alkaline earth metals).

The source of nitrogenous reductant can be ammonia per se, hydrazine or any suitable ammonia precursor, such as urea (($NH_2$)$_2CO$), ammonium carbonate, ammonium carbamate, ammonium hydrogen carbonate or ammonium formate.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, coffee roasting plants etc.

In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a zeolite catalyst containing at least one transition metal disposed in a flow path of the exhaust gas and means for metering nitrogenous reductant into a flowing exhaust gas upstream of the zeolite catalyst, wherein the zeolite catalyst is a small pore zeolite containing a maximum ring size of eight tetrahedral atoms, wherein the at least one transition metal is selected from the group consisting of Cr, Mn, Fe, Co, Ce, Ni, Cu, Zn, Ga, Mo, Ru, Rh, Pd, Ag, In, Sn, Re, Ir and Pt.

For the avoidance of doubt, the small pore transition metal-containing zeolites for use in the exhaust system aspect of the present invention include any for use in the method according to the invention as described hereinabove.

In one embodiment, the zeolite catalyst is coated on a flow-through monolith substrate (i.e. a honeycomb monolithic catalyst support structure with many small, parallel channels running axially through the entire part) or filter monolith substrate such as a wall-flow filter etc., as described hereinabove. In another embodiment, the zeolite catalyst is formed into an extruded-type catalyst.

The system can include means, when in use, for controlling the metering means so that nitrogenous reductant is metered into the flowing exhaust gas only when it is determined that the zeolite catalyst is capable of catalysing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas.

The control means can comprise a pre-programmed processor such as an electronic control unit (ECU).

The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

In a further embodiment, an oxidation catalyst for oxidising nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. This concept is disclosed in S. Kasaoka et al. "Effect of Inlet $NO/NO_2$ Molar Ratio and Contribution of Oxygen in the Catalytic Reduction of Nitrogen Oxides with Ammonia", Nippon Kagaku Kaishi, 1978, No. 6, pp. 874-881 and WO 99/39809.

The oxidation catalyst can include at least one platinum group metal (or some combination of these), such as platinum, palladium or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the zeolite catalyst. Filter substrates can be selected from any of those mentioned above, e.g. wall flow filters. Where the filter is catalysed, e.g. with an oxidation catalyst of the kind discussed above, preferably the point of metering nitrogenous reductant is located between the filter and the zeolite catalyst. Alternatively, if the filter is uncatalysed, the means for metering nitrogenous reductant can be located between the oxidation catalyst and the filter. It will be appreciated that this arrangement is disclosed in WO 99/39809.

In a further embodiment, the zeolite catalyst for use in the present invention is coated on a filter located downstream of the oxidation catalyst. Where the filter includes the zeolite catalyst for use in the present invention, the point of metering the nitrogenous reductant is preferably located between the oxidation catalyst and the filter.

In one embodiment, the control means meters nitrogenous reductant into the flowing exhaust gas only when the exhaust gas temperature is at least 100° C., for example only when the exhaust gas temperature is from 150° C. to 750° C.

In a further aspect, there is provided a vehicular lean-burn engine comprising an exhaust system according to the present invention.

The vehicular lean burn internal combustion engine can be a diesel engine, a lean-burn gasoline engine or an engine powered by liquid petroleum gas or natural gas.

In order that the invention may be more fully understood, reference is made to the following Examples by way of illustration only and with reference to the accompanying drawings, in which.

Figure 23:
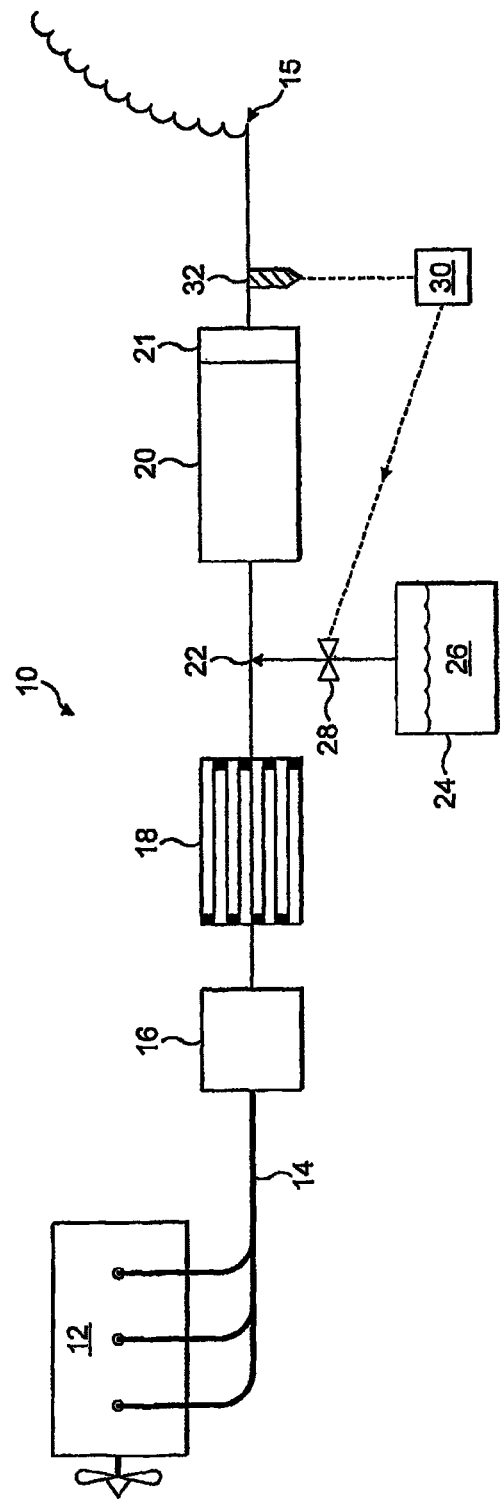
FIG. 23 is a schematic diagram of an embodiment of an exhaust system according to the present invention.

FIG. 23 is a schematic diagram of an embodiment of an exhaust system according to the present invention, wherein diesel engine 12 comprises an exhaust system 10 according to the present invention comprising an exhaust line 14 for conveying an exhaust gas from the engine to atmosphere via tailpipe 15. In the flow path of the exhaust gas is disposed a platinum or platinum/palladium NO oxidation catalyst 16 coated on a ceramic flow-through substrate monolith. Located downstream of oxidation catalyst 16 in the exhaust system is a ceramic wall-flow filter 18.

An iron/small pore zeolite SCR catalyst 20 also coated on a ceramic flow-through substrate monolith is disposed downstream of the wall-flow filter 18. An $NH_3$ oxidation clean-up or slip catalyst 21 is coated on a downstream end of the SCR catalyst monolith substrate. Alternatively, the $NH_3$ slip catalyst can be coated on a separate substrate located downstream of the SCR catalyst. Means (injector 22) is provided for introducing nitrogenous reductant fluid (urea 26) from reservoir 24 into exhaust gas carried in the exhaust line 14. Injector 22 is controlled using valve 28, which valve is in turn controlled by electronic control unit 30 (valve control represented by dotted line). Electronic control unit 30 receives closed loop feedback control input from a $NO_x$ sensor 32 located downstream of the SCR catalyst.

In use, the oxidation catalyst 16 passively oxidises NO to $NO_2$, particulate matter is trapped on filter 18 and is combusted in $NO_2$. $NO_x$ emitted from the filter is reduced on the SCR catalyst 20 in the presence of ammonia derived from urea injected via injector 22. It is also understood that mixtures of NO and $NO_2$ in the total $NO_x$ content of the exhaust gas entering the SCR catalyst (about 1:1) are desirable for $NO_x$ reduction on a SCR catalyst as they are more readily reduced to $N_2$. The $NH_3$ slip catalyst 21 oxidises $NH_3$ that would otherwise be exhausted to atmosphere. A similar arrangement is described in WO 99/39809.

EXAMPLES

Example 1

Method of Making Fresh 5 wt % Fe/BetaBeta or SAPO-34 or 3 wt % SSZ-13 Zeolite Catalyst Commercially available Beta zeolite, SAPO-34 or SSZ-13 was $NH_4^+$ ion exchanged in a solution of $NH_4NO_3$, then filtered. The resulting material was added to an aqueous solution of $Fe(NO_3)_3$ with stirring. The slurry was filtered, then washed and dried. The procedure can be repeated to achieve a desired metal loading. The final product was calcined.

Example 2

Method of Making Fresh 3 wt % Cu/Zeolites

Commercially available SAPO-34, SSZ-13, Sigma-1, ZSM-34, Nu-3, ZSM-5 and Beta zeolites were $NH_4^+$ ion exchanged in a solution of $NH_4NO_3$, then filtered. The resulting materials were added to an aqueous solution of $Cu(NO_3)_2$ with stirring. The slurry was filtered, then washed and dried. The procedure can be repeated to achieve a desired metal loading. The final product was calcined.

Example 3

Lean Hydrothermal Ageing

The catalysts obtained by means of Examples 1 and 2 were lean hydrothermally aged at 750° C. for 24 hours in 4.5% $H_2O$/air mixture.

Example 4

Severe Lean Hydrothermal Ageing

The catalysts obtained by means of Examples 1 and 2 were severely lean hydrothermally aged at 900° C. for 1 hour in 4.5% $H_2O$/air mixture.

Example 5

Extended Severe Lean Hydrothermal Ageing

The catalysts obtained by means of Examples 1 and 2 were severely lean hydrothermally aged at 900° C. for a period of 3 hours in 4.5% $H_2O$/air mixture.

Example 6

Test Conditions

Separate samples of Fe/BetaBeta prepared according to Example 1 and Cu/BetaBeta, Cu/ZSM-5 and Cu/SAPO-34 prepared according to Example 2 were aged according to Examples 3 and 4 and tested in a laboratory apparatus using the following gas mixture: 350 ppm NO, 350 ppm $NH_3$, 14% $O_2$, 4.5% $H_2O$, 4.5% $CO_2$, $N_2$ balance. The results are shown in FIGS. 1 to 4 inclusive.

Tests were also conducted on Cu/BetaBeta, Cu/ZSM-5, Cu/SAPO-34 and Cu/Nu-3 prepared according to Example 2 and aged according to Example 3 and tested in a laboratory apparatus using the same gas mixture as described above, except in that 12% $O_2$ was used. The results are shown in FIGS. 5 to 8 inclusive.

Example 7 n-Octane Adsorption Test Conditions

With the catalyst loaded in a laboratory apparatus, 1000 ppm (as C1 equivalents) propene, n-octane or toluene was injected during $NH_3$ SCR at 300° C. (350 ppm NO, 350 ppm $NH_3$, 12% $O_2$, 4.5% $H_2O$, 4.5% $CO_2$, balance $N_2$). Hydrocarbon desorption was measured by ramping the temperature at 10° C./minute in 12% $O_2$, 4.5% $H_2O$, 4.5% $CO_2$, balance $N_2$.

Example 8

Results for Experiments Shown in FIGS. 1 to 4 Inclusive

Figure 1:
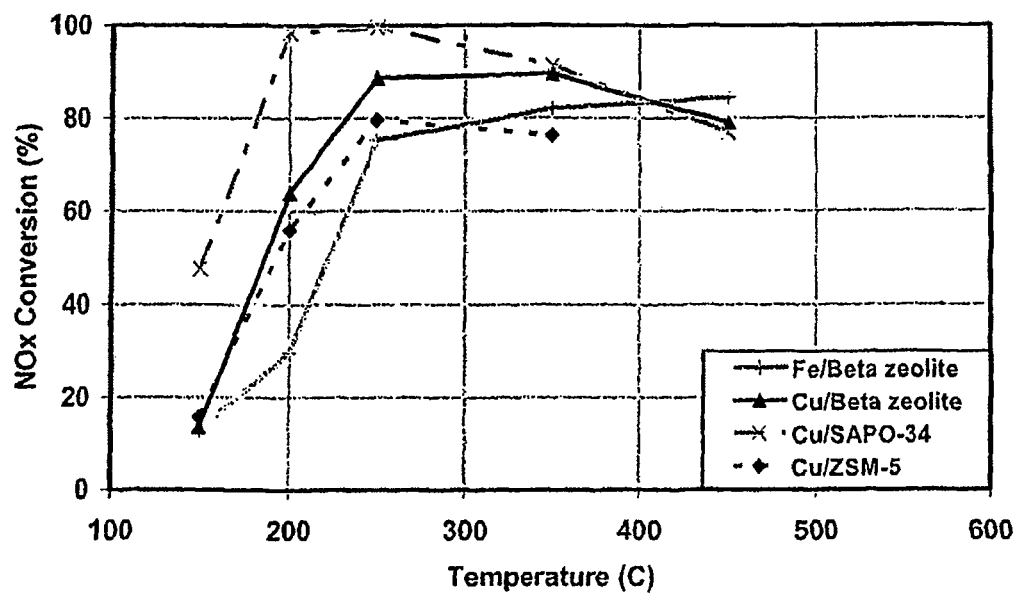
FIG. 1 is a graph showing $NO_x$ conversion (at a gas hourly space velocity of 30,000 $hr^{-1}$) comparing transition metal-containing aluminosilicate catalysts with a transition metal-containing aluminophosphate/small pore zeolite catalyst after relatively moderate lean hydrothermal ageing performed on a laboratory reactor.

FIG. 1 compares the $NO_x$ reduction efficiencies of a Cu/SAPO-34 catalyst against a series of aluminosilicate zeolite supported transition metal catalysts (Cu/ZSM-5, Cu/Beta and Fe/Beta) after a mild aging. The result clearly demonstrates that Cu/SAPO-34 has improved low temperature activity for SCR of $NO_x$ with $NH_3$.

Figure 2:
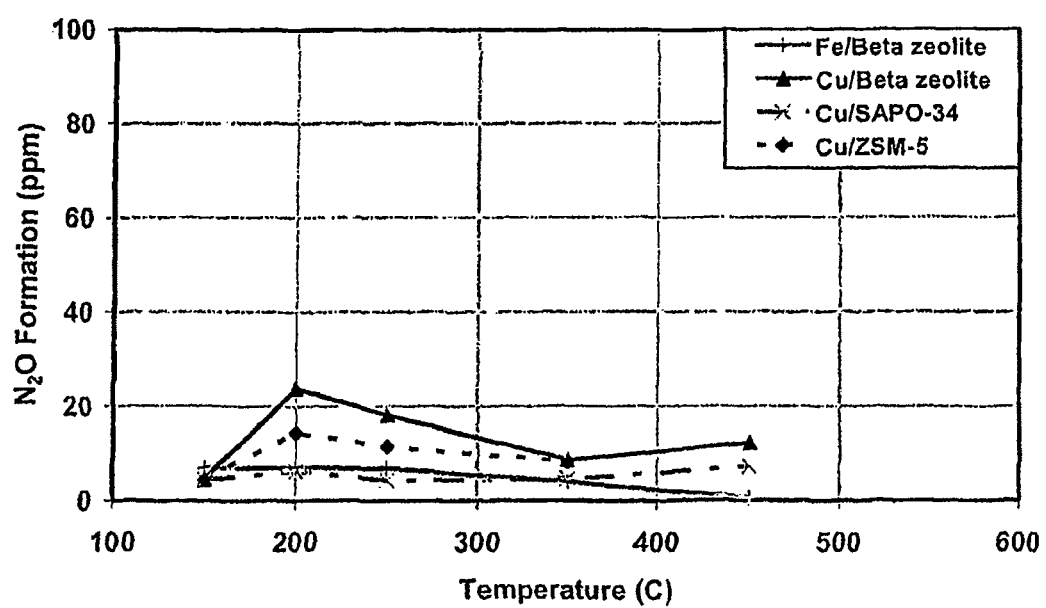
FIG. 2 is a graph showing $N_2O$ formation in the test shown in FIG. 1.

FIG. 2 compares the $N_2O$ formation over the catalysts. It is clear that the Cu/SAPO-34 catalyst produced lower levels of $N_2O$ compared to the other two Cu-containing catalysts. The Fe-containing catalyst also exhibits low $N_2O$ formation, but as shown in FIG. 1, the Fe catalyst is less active at lower temperatures.

Figure 3:
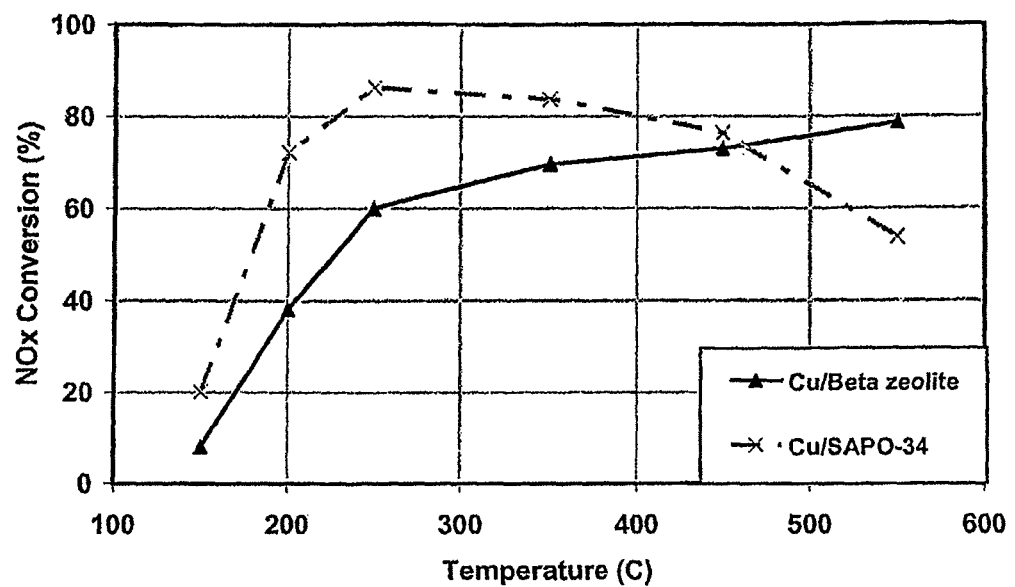
FIG. 3 is a graph showing $NO_x$ conversion (at a gas hourly space velocity of 100,000 $hr^{-1}$) comparing Cu/Beta zeolite and Cu/SAPO-34 catalysts with a transition metal-containing aluminophosphate/small pore zeolite catalyst after relatively moderate lean hydrothermal ageing performed on a laboratory reactor.

FIG. 3 compares the $NO_x$ reduction efficiencies of a Cu/SAPO-34 catalyst against a Cu/Beta catalyst tested at a higher gas hourly space velocity. The Cu/SAPO-34 catalyst is significantly more active than the Cu-Beta catalyst at low reaction temperatures.

Figure 4:
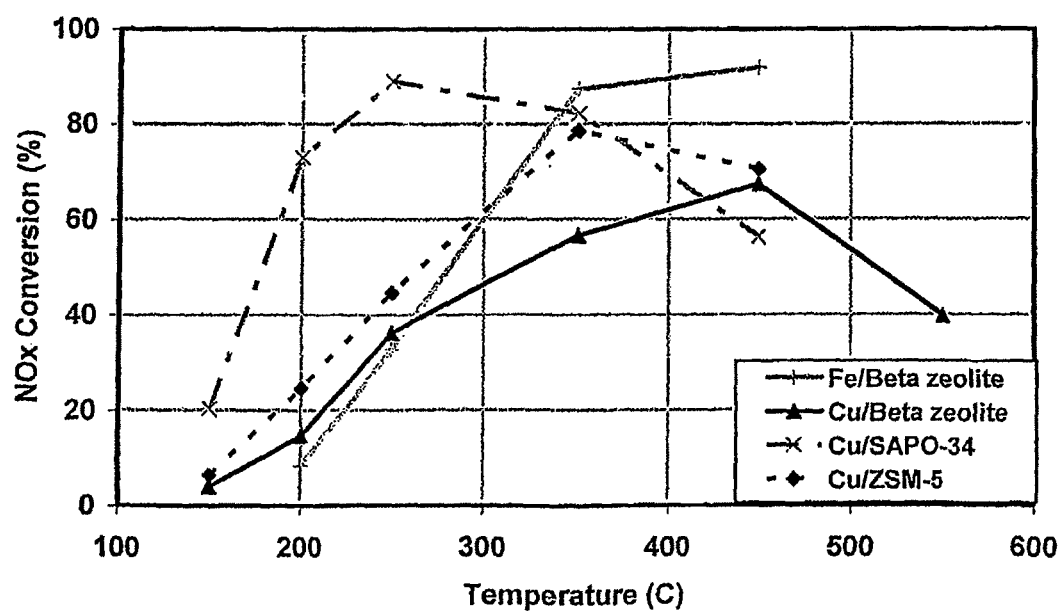
FIG. 4 is a graph showing $NO_x$ conversion (at a gas hourly space velocity of 30,000 $hr^{-1}$) comparing transition metal-containing aluminosilicate catalysts with a transition metal-containing aluminophosphate/small pore zeolite catalyst after relatively severe lean hydrothermal ageing performed on a laboratory reactor.

FIG. 4 shows the $NO_x$ reduction efficiencies of a Cu/SAPO-34 catalyst and a series of aluminosilicate zeolite supported transition metal catalysts (Cu/ZSM-5, Cu/Beta, and Fe/Beta) after severe lean hydrothermal aging. The result clearly demonstrates that the Cu/SAPO-34 catalyst has superior hydrothermal stability.

Example 9

Figure 5:
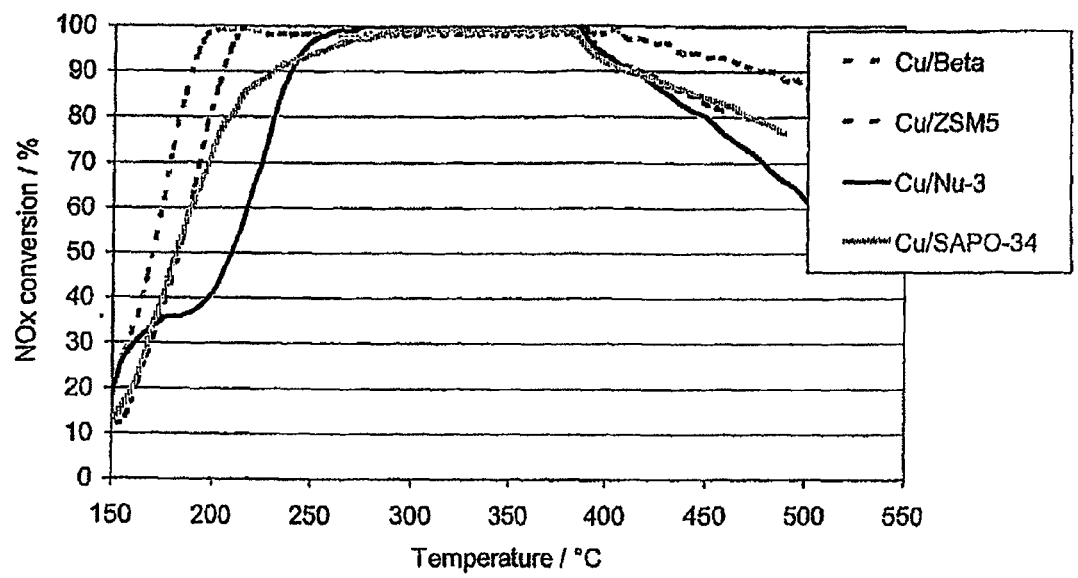
FIG. 5 is a graph showing $NO_x$ conversion for fresh Cu/Zeolite catalysts.
Figure 6:
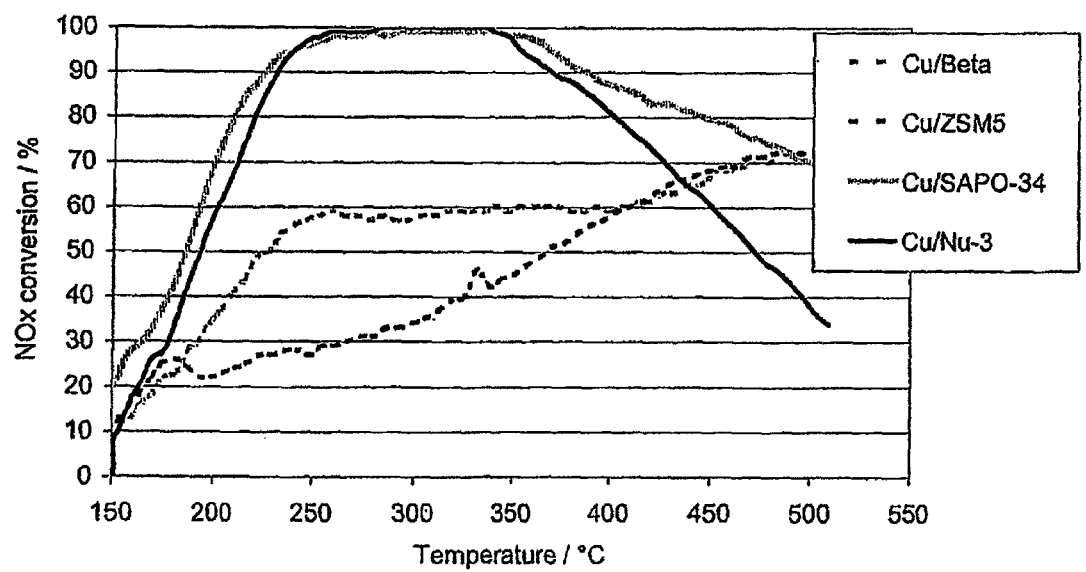
FIG. 6 is a graph showing $NO_x$ conversion for aged Cu/Zeolite catalysts.

Results for Experiments Shown in FIGS. 5 to 12 Inclusive $NH_3$ SCR activity of fresh (i.e. un-aged) Cu supported on the small pore zeolites SAPO-34 and Nu-3 was compared to that of Cu supported on larger pore zeolites in FIG. 5. The corresponding activity for the same catalysts aged under severe lean hydrothermal conditions is shown in FIG. 6. Comparison of the fresh and aged activity profiles demonstrates that hydrothermal stability is only achieved for aluminosilicate zeolites when the Cu is supported on a small pore zeolite.

Figure 7:
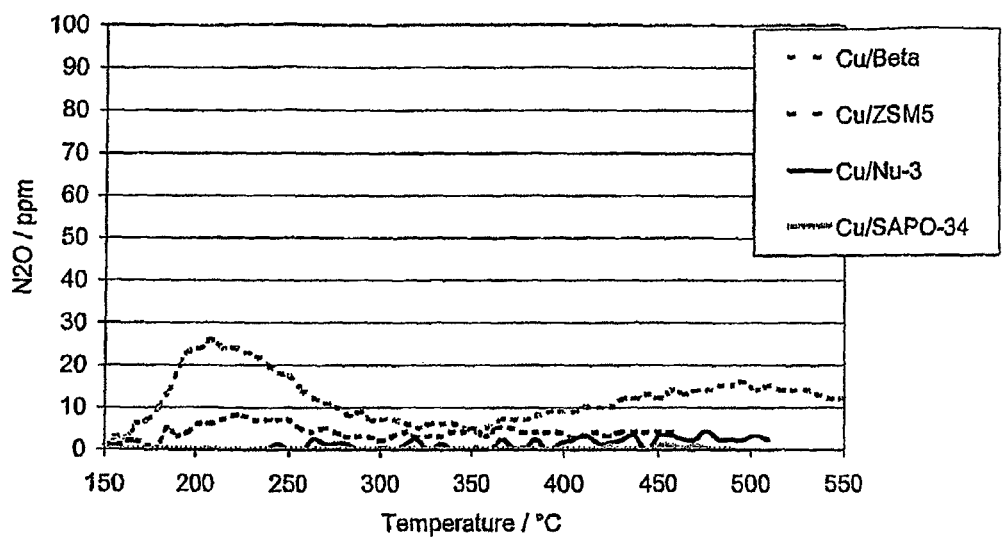
FIG. 7 is a graph showing $N_2O$ formation for fresh Cu/Zeolite catalysts of FIG. 5.
Figure 8:
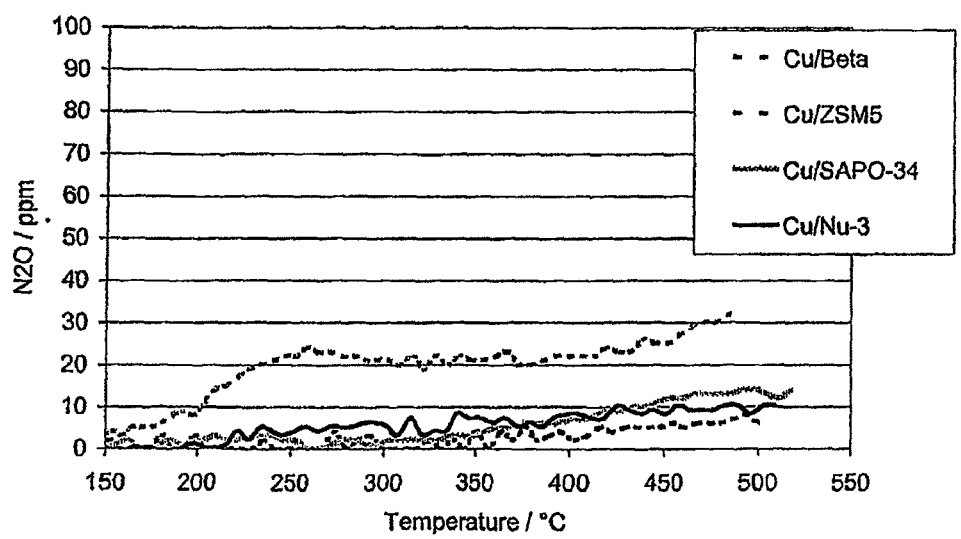
FIG. 8 is a graph showing $N_2O$ formation for aged Cu/Zeolite catalysts of FIG. 6.

The $N_2O$ formation measured for the fresh and aged catalysts is shown in FIGS. 7 and 8, respectively. The results clearly show that $N_2O$ formation is significantly reduced by means of supporting Cu on zeolites that do not have large pores.

Figure 9:
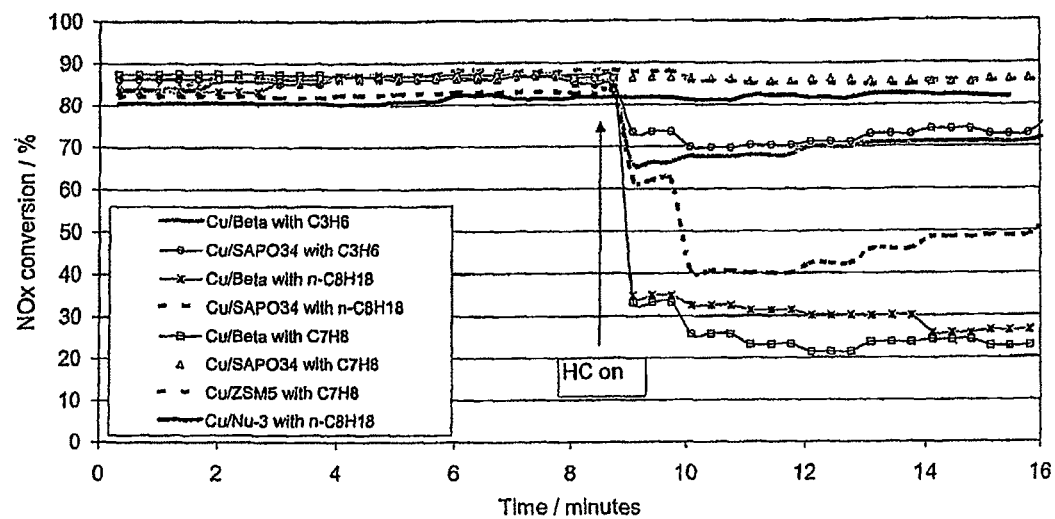
FIG. 9 is a graph showing the effect of adding HC species to Cu/zeolite catalysts during $NH_3$ SCR at 300° C.
Figure 10:
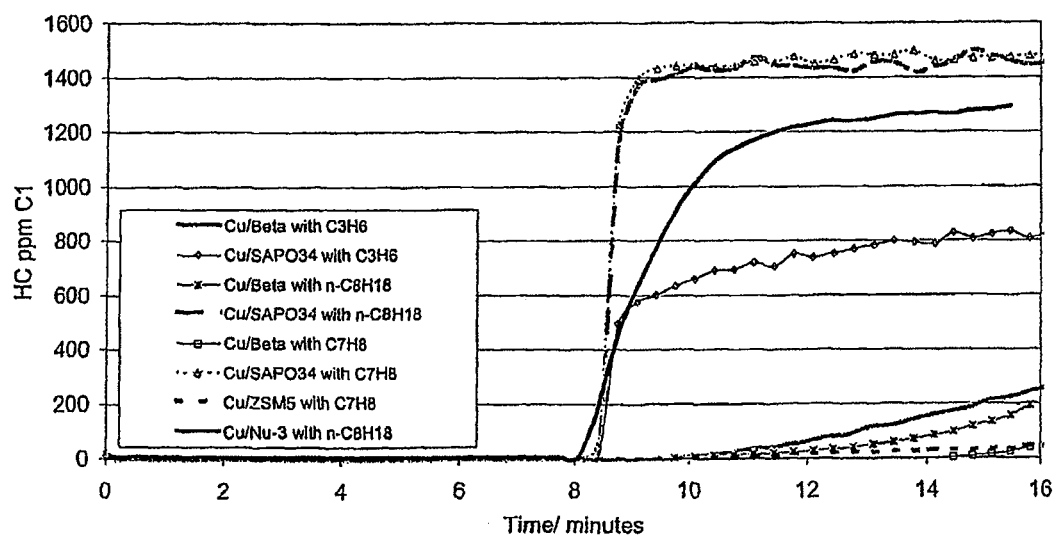
FIG. 10 is a graph showing hydrocarbon breakthrough following addition of hydrocarbon species to Cu/zeolite catalysts during $NH_3$ SCR at 300° C.

FIG. 9 compares the effect of HC on Cu/zeolite catalysts where SAPO-34 and Nu-3 are used as examples of small pore zeolite materials. For comparison, ZSM-5 and Beta zeolite are used as examples of a medium and large pore zeolite, respectively. Samples were exposed to different HC species (propene, n-octane and toluene) during $NH_3$ SCR reaction at 300° C. FIG. 10 shows the corresponding HC breakthrough following HC addition.

Figure 11:
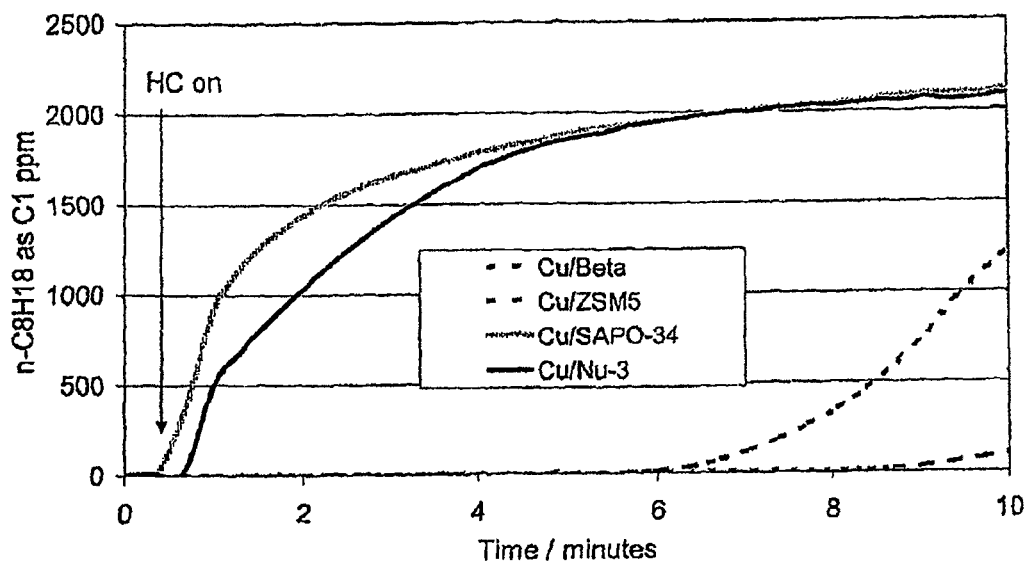
FIG. 11 is a graph showing the adsorption profiles of n-octane at 150° C. flowing through the Cu zeolite catalysts.
Figure 12:
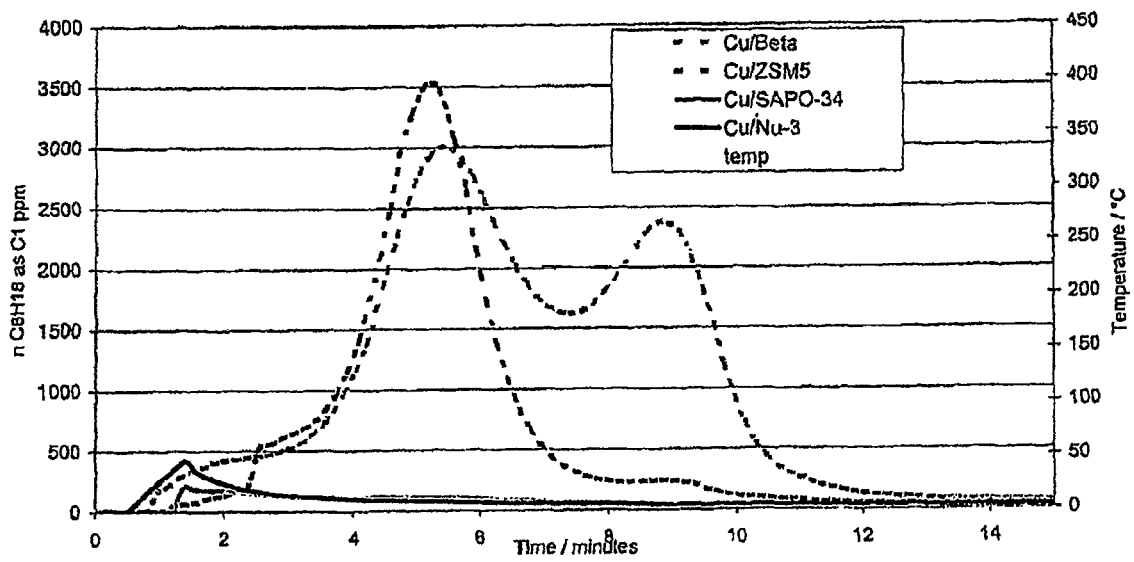
FIG. 12 is a graph of the temperature programmed desorption (TPD) of HC species to Cu/zeolite catalysts after HC adsorption at 150° C.

FIG. 11 shows the adsorption profiles of n-octane at 150° C. flowing through different Cu/zeolite catalysts. HC breakthrough is observed almost immediately with Cu supported on the small pore zeolites SAPO-34 and Nu-3, whereas significant HC uptake is observed with Cu on Beta zeolite and ZSM-5. FIG. 12 shows the subsequent HC desorption profile as a function of increasing temperature and confirms that large amounts of HC are stored when Cu is supported on the larger pore zeolites, whereas very little HC is stored when small pore zeolites are employed.

Example 10

Figure 13:
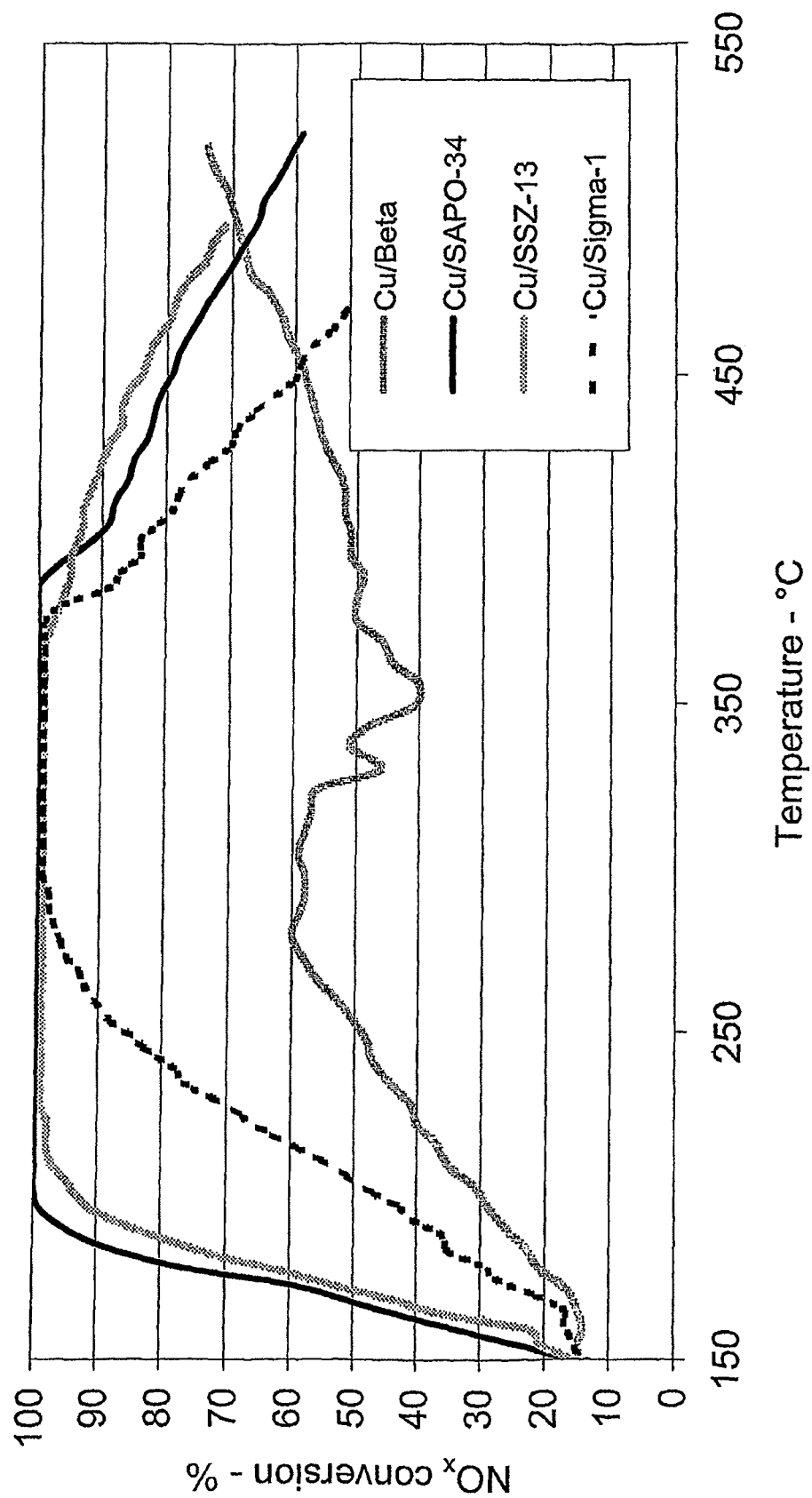
FIG. 13 is a graph similar to FIG. 6 comparing $NO_x$ conversion activity for aged Cu/Sigma-1, Cu-SAPO-34, Cu/SSZ-13 and Cu/Beta.
Figure 14:
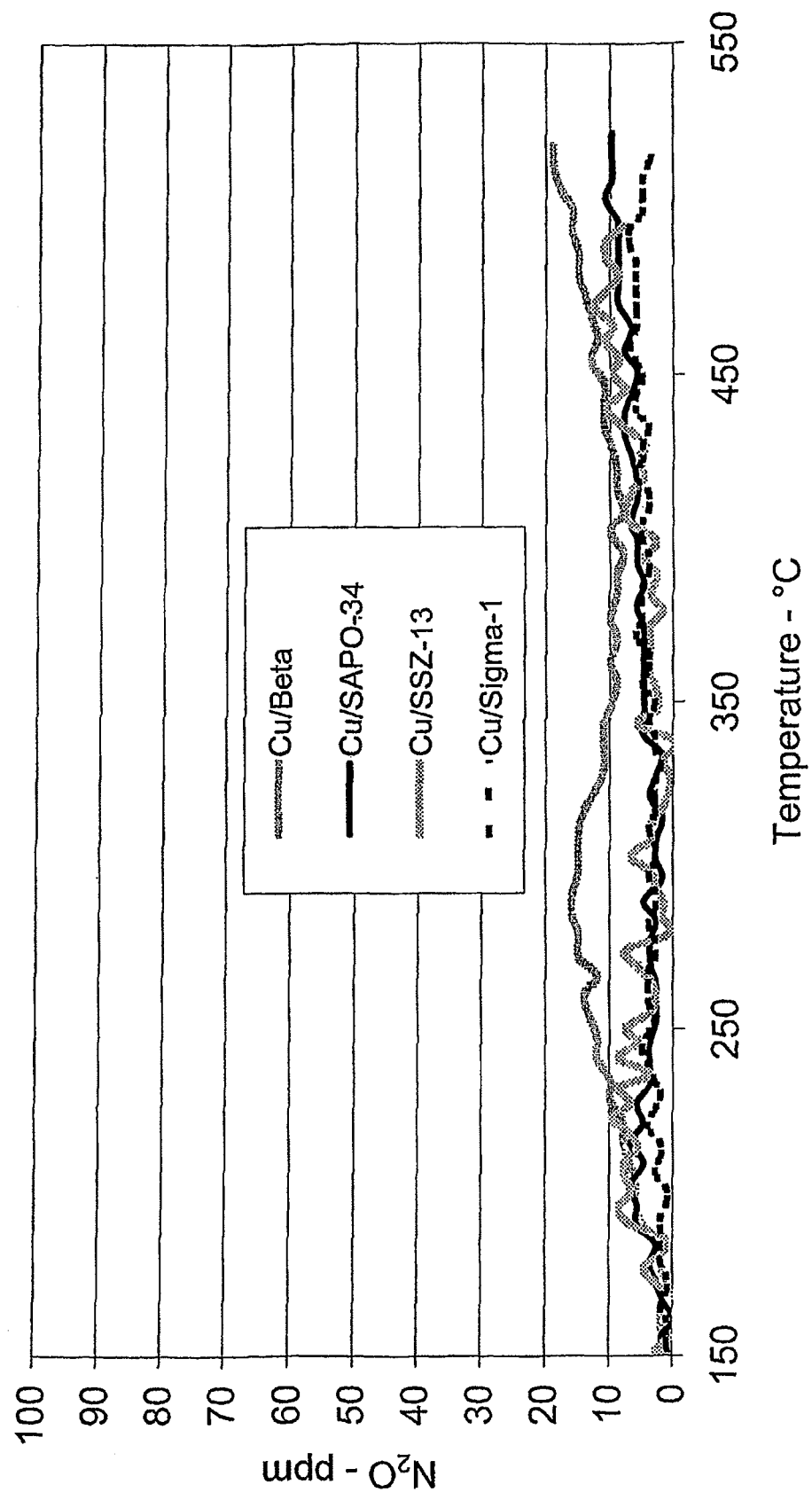
FIG. 14 is a graph similar to FIG. 8 comparing $N_2O$ formation for the aged Cu/zeolite catalysts of FIG. 13.

Results for Experiments Shown in FIGS. 13 and 14

Cu/SSZ-13, Cu/SAPO-34, Cu/Sigma-1 and Cu/Beta prepared according to Example 2 were aged in the manner described in Example 4 and tested according to Example 6. The results are shown in FIG. 13, from which it can be seen that the $NO_x$ conversion activity of each of the severely lean hydrothermally aged Cu/SSZ-13, Cu/SAPO-34 and Cu/Sigma-1 samples is significantly better than that of the corresponding large-pore zeolite, Cu/Beta. Moreover, from FIG. 14 it can be seen that Cu/Beta generates significantly more $N_2O$ than the Cu/small-pore zeolite catalysts.

Example 11

Figure 15:
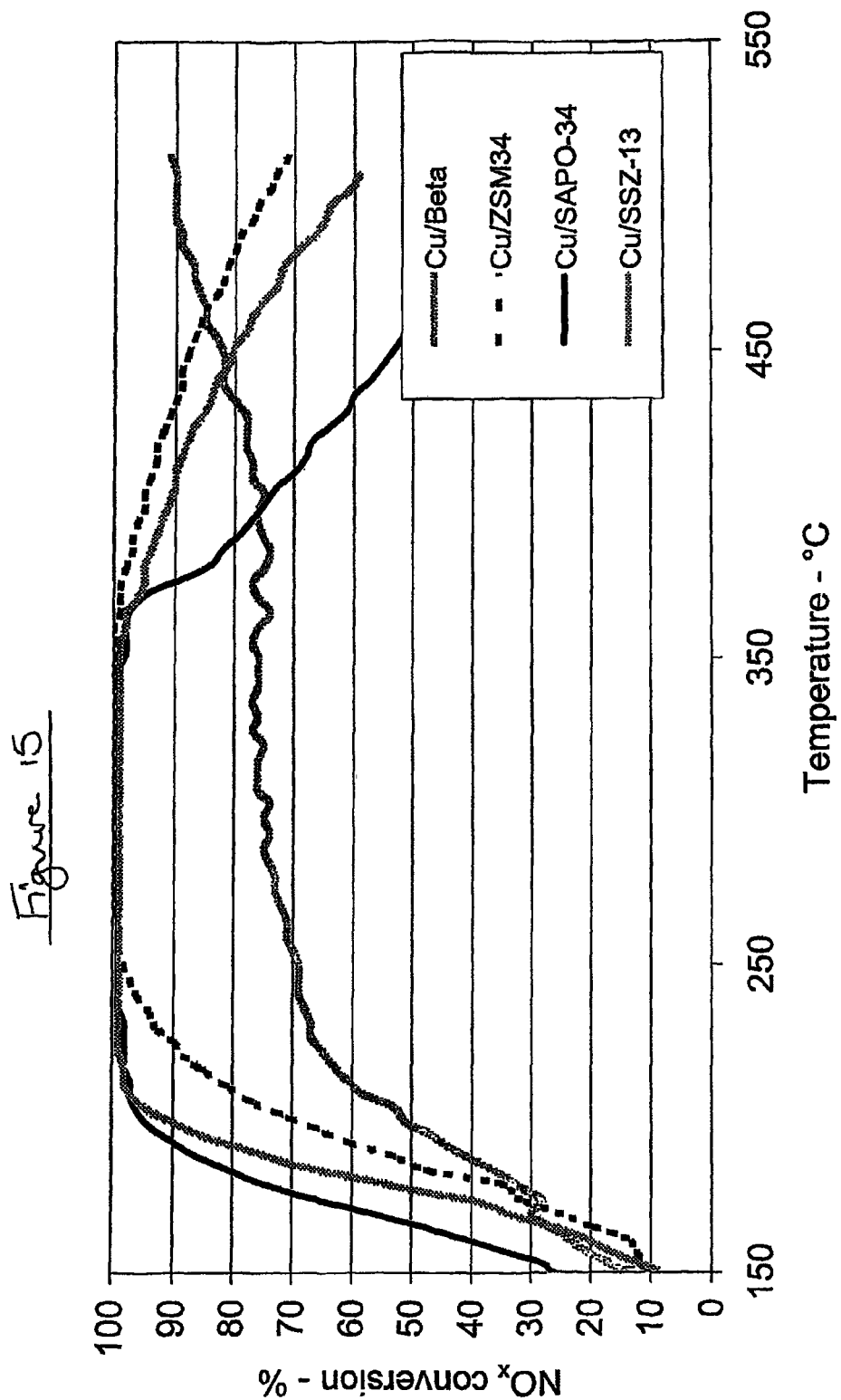
FIG. 15 is a graph similar to FIG. 13 comparing $NO_x$ conversion activity for aged Cu/ZSM-34, Cu/SAPO-34, Cu/SSZ-13 and Cu/Beta catalysts.

Results for Experiments Shown in FIG. 15

Cu/ZSM-34, Cu/SAPO-34, Cu/SSZ-13 and Cu/Beta prepared according to Example 2 were aged in the manner described in Example 3 and tested according to Example 6. The results are shown in FIG. 15, from which it can be seen that the $NO_x$ conversion activity of each of the lean hydrothermally aged Cu/SSZ-13, Cu/SAPO-34 and Cu/ZSM-34 samples is significantly better than that of the corresponding large-pore zeolite, Cu/Beta.

Example 12

Figure 16:
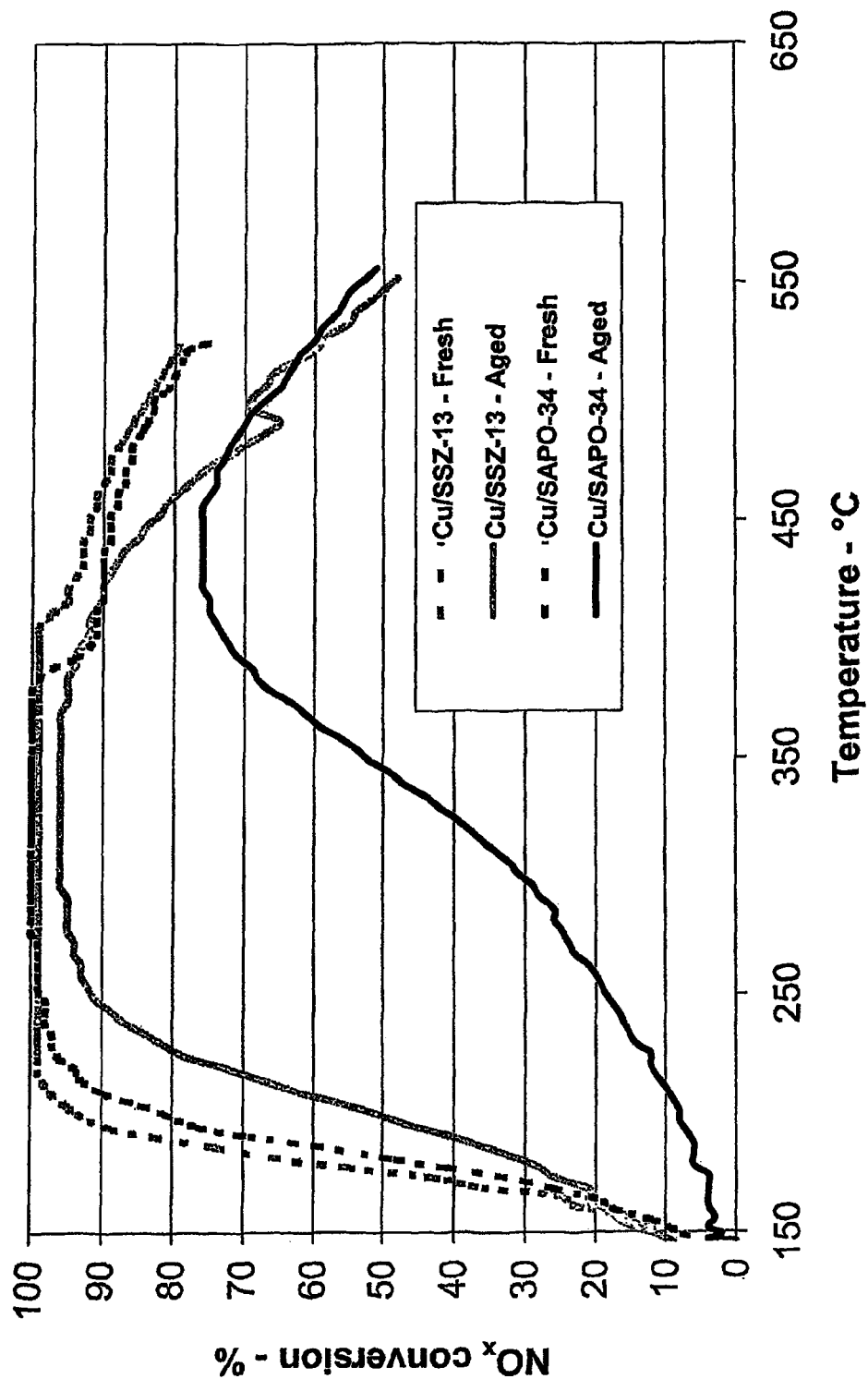
FIG. 16 is a graph comparing the $NO_x$ conversion activity of fresh and aged Cu-SAPO-34 and Cu/SSZ-13 catalysts.

Results for Experiments Shown in FIG. 16

Fresh samples of Cu/SSZ-13 and Cu/SAPO-34 were prepared according to Example 2, samples of which were aged in the manner described in Example 5. Fresh (i.e. un-aged) and aged samples were tested according to Example 6 and the results are shown in FIG. 16, from which it can be seen that the $NO_x$ conversion activity of Cu/SSZ-13 is maintained even after extended severe lean hydrothermal ageing.

Example 13

Figure 17:
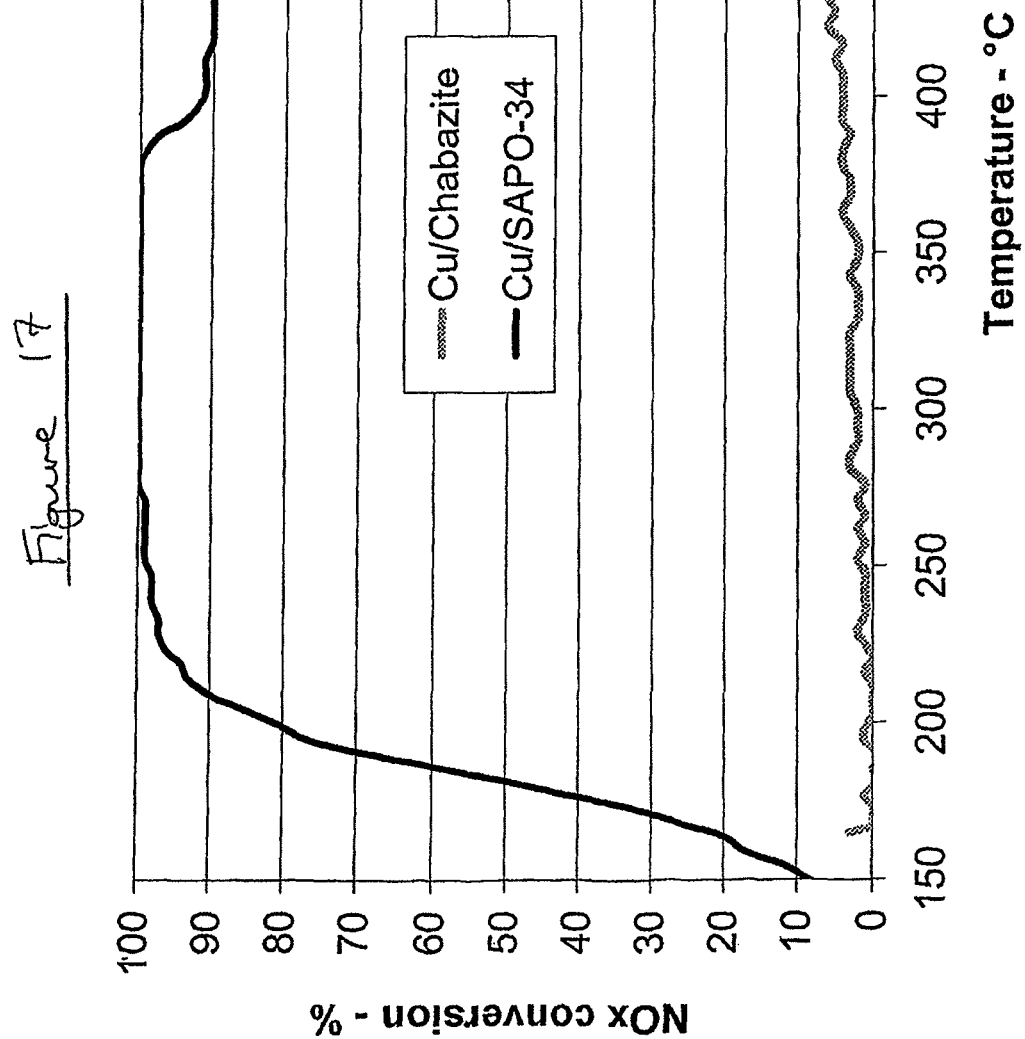
FIG. 17 is a graph comparing the $NO_x$ conversion activity of fresh samples of Cu/SAPO-34 with a Cu/naturally occurring chabazite type material.
Figure 18:
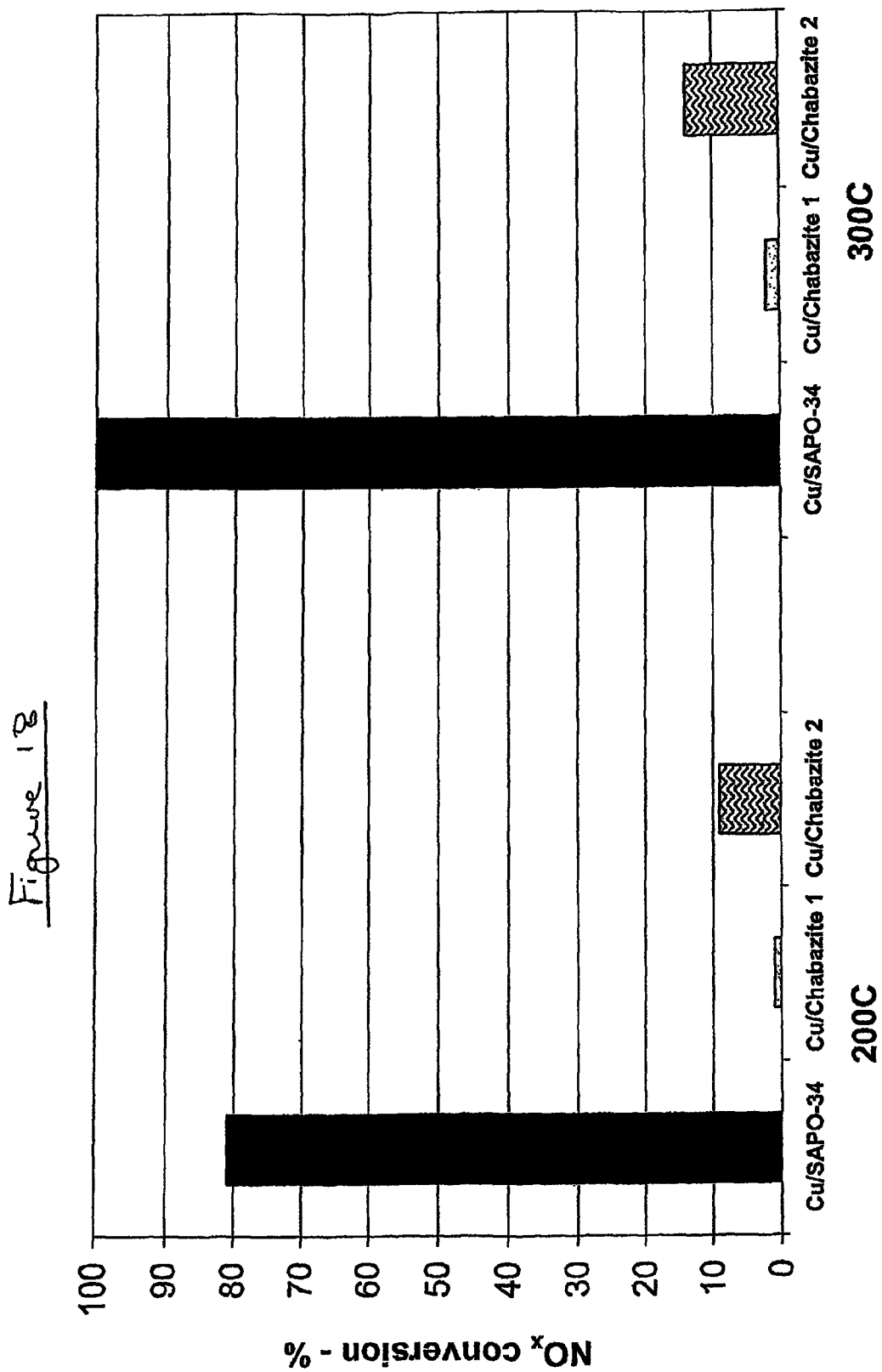
FIG. 18 is a bar chart comparing the $NO_x$ conversion activity of fresh Cu/SAPO-34 with that of two fresh Cu/naturally occurring chabazite type materials at two temperature data points.

Results for Experiments Shown in FIGS. 17 and 18

Cu/SAPO-34 and a Cu/naturally occurring chabazite type material having a SAR of about 4 were prepared according to Example 2 and the fresh materials were tested according to Example 6. The results are shown in FIG. 17, from which it can be seen that the $NO_x$ conversion activity of the naturally occurring Cu/chabazite is significantly lower than Cu/SAPO-34. FIG. 18 is a bar chart comparing the $NO_x$ conversion activity of two fresh Cu/naturally occurring chabazite type materials prepared according to Example 2 at two temperature data points (200° C. and 300° C.), a first chabazite material having a SAR of about 4 and a second chabazite material of SAR about 7. It can be seen that whilst the $NO_x$ conversion activity for the SAR 7 chabazite is better than for the SAR 4 chabazite material, the activity of the SAR 7 chabazite material is still significantly lower than the fresh Cu/SAPO-34.

Example 14

Figure 19:
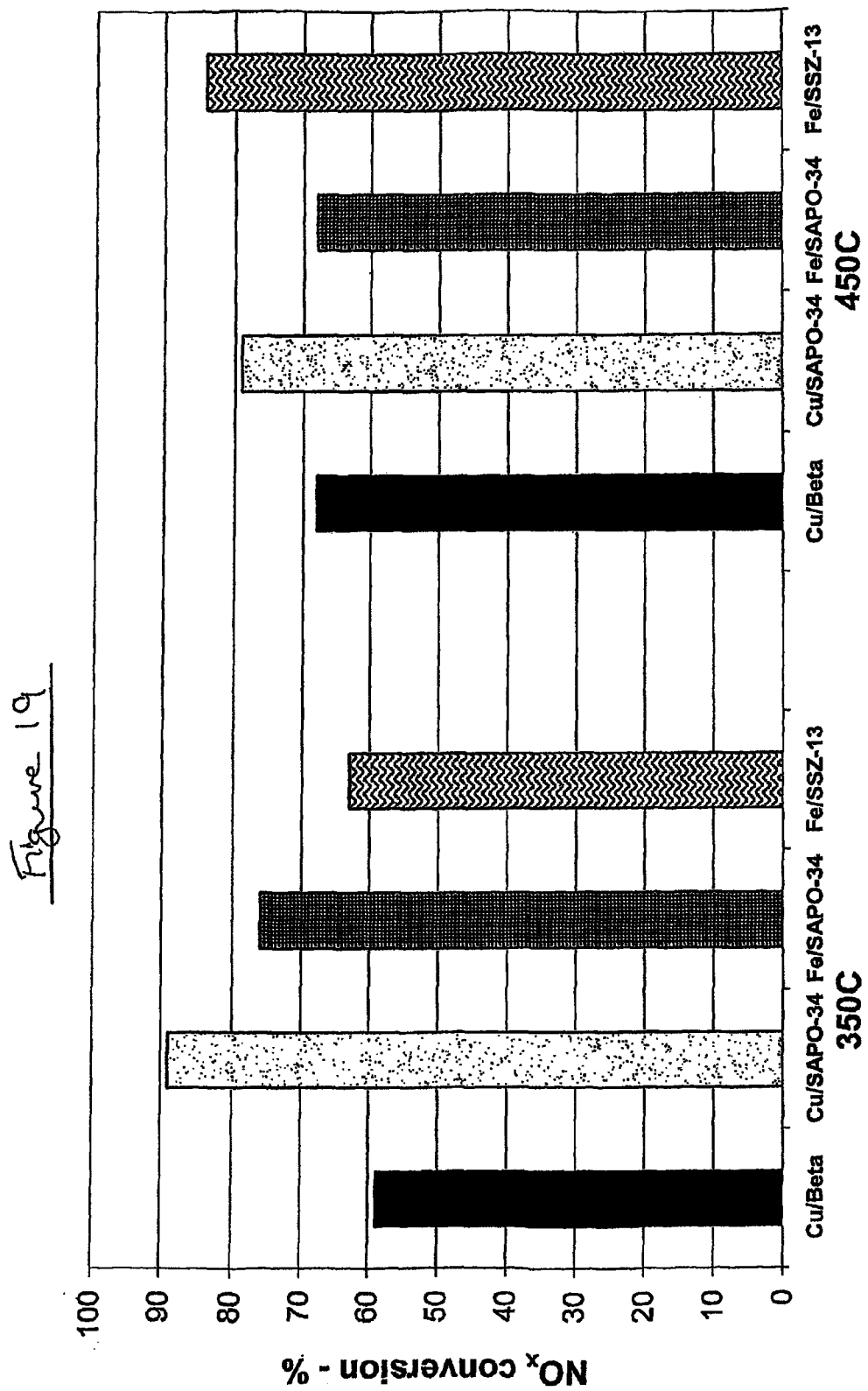
FIG. 19 is a bar chart comparing the $NO_x$ conversion activity of aged Cu/Beta, Cu/SAPO-34, Fe/SAPO-34 and Fe/SSZ-13 catalysts at two temperature data points.

Results for Experiments Shown in FIG. 19

Cu/SAPO-34 and Cu/Beta were prepared according to Example 2. Fe/SAPO-34 and Fe/SSZ-13 were prepared according to Example 1. The samples were aged according to Example 4 and the aged samples were tested according to Example 6. The $NO_x$ activity at the 350° C. and 450° C. data points is shown in FIG. 19, from which it can be seen that the Cu/SAPO-34, Fe/SAPO-34 and Fe/SSZ-13 samples exhibit comparable or better performance than the Cu/Beta reference.

Example 15

Figure 20:
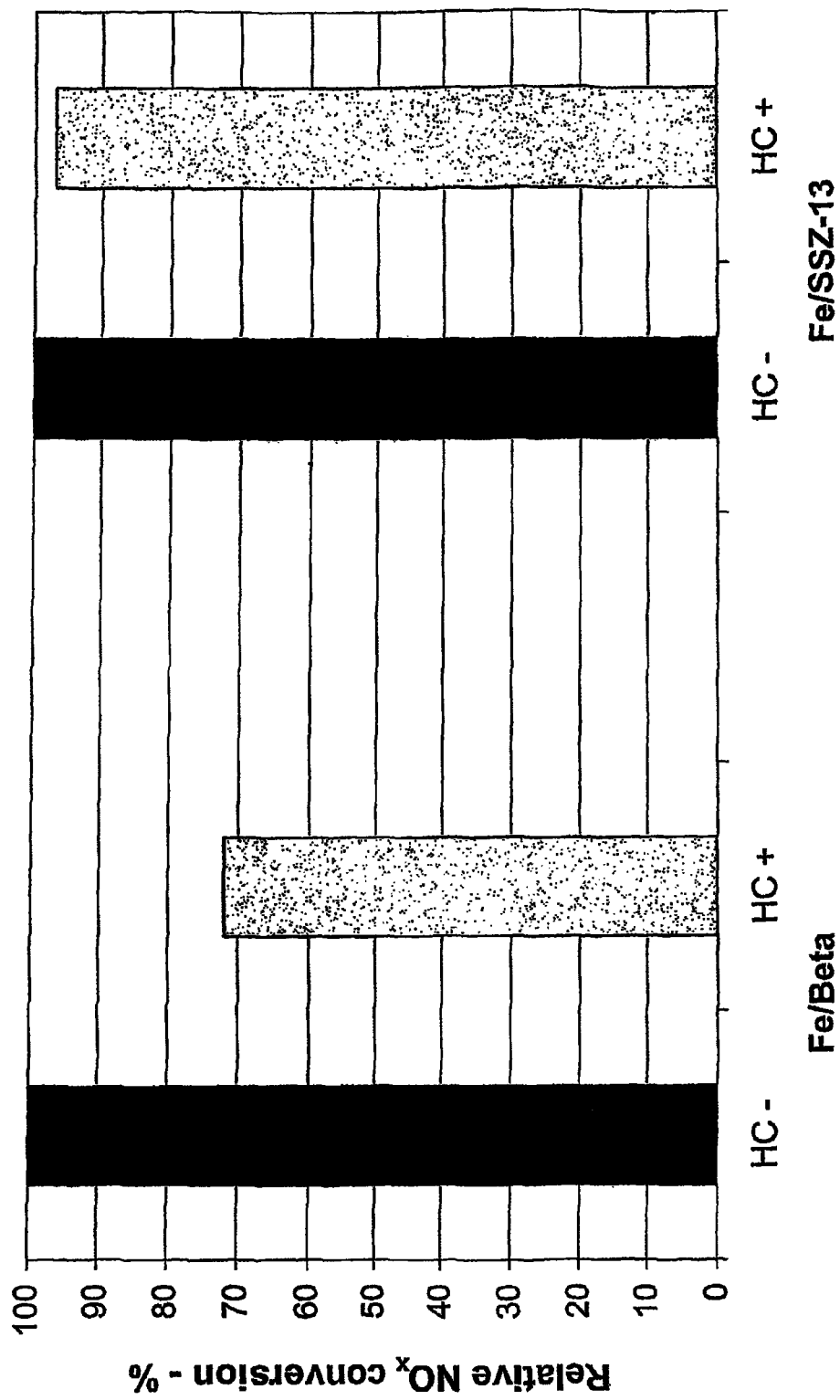
FIG. 20 is a bar chart comparing the hydrocarbon inhibition effect of introducing n-octane into a feed gas for fresh Fe/Beta and Fe/SSZ-13 catalysts.
Figure 21:
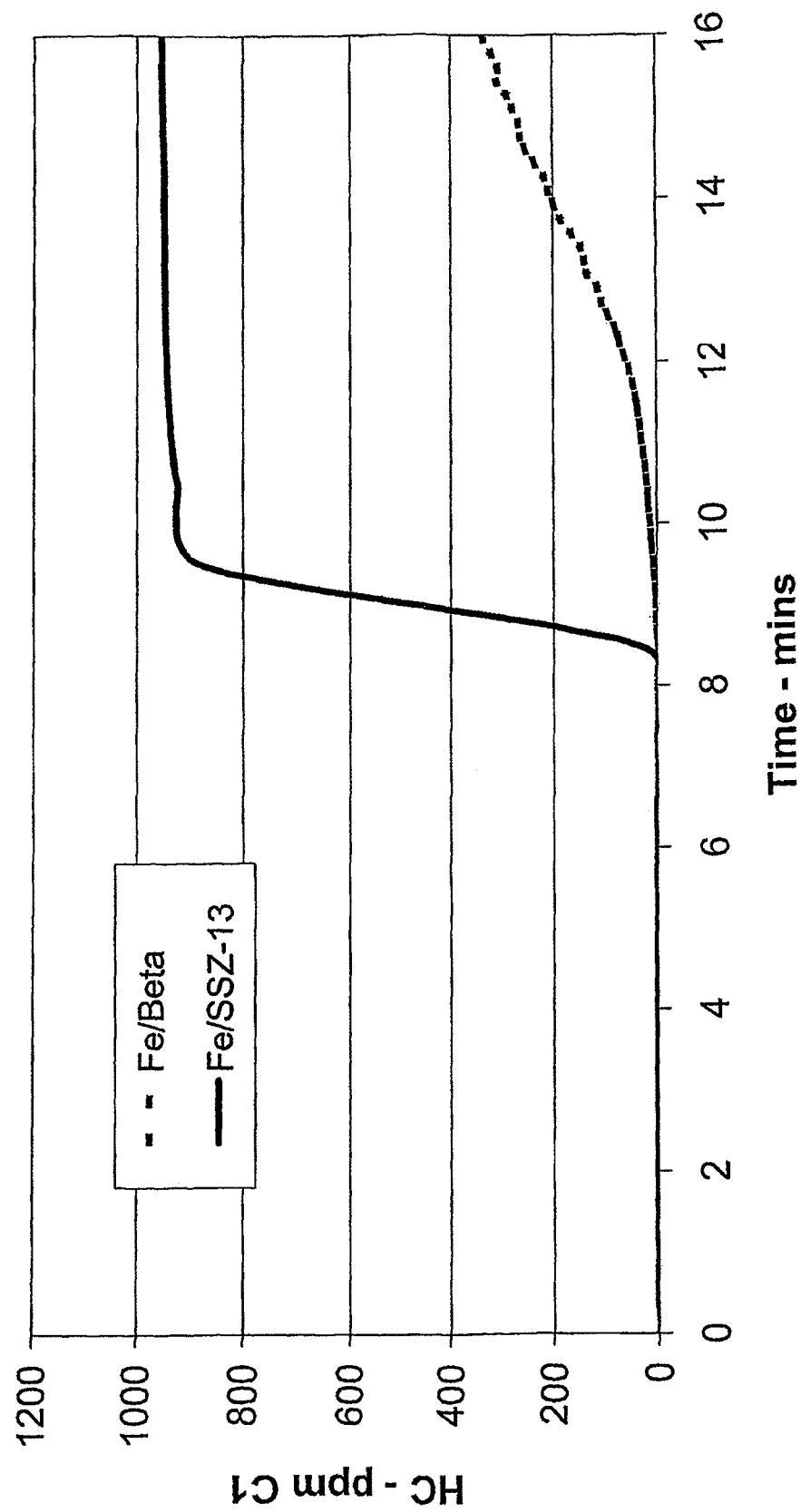
FIG. 21 is a graph showing hydrocarbon breakthrough following the introduction of n-octane in the experiment of FIG. 20.

Results for Experiments Shown in FIGS. 20 and 21

Fe/SSZ-13 and Fe/Beta prepared according to Example 1 were tested fresh as described in Example 7, wherein n-octane (to replicate the effects of unburned diesel fuel in a exhaust gas) was introduced at 8 minutes into the test. The results shown in FIG. 20 compare the NOx conversion activity at 8 minutes into the test, but before n-octane was introduced into the feed gas (HC−) and 8 minutes after n-octane was introduced into the feed gas (HC+). It can be seen that the Fe/Beta activity dramatically reduces following n-octane introduction compared with Fe/SSZ-13. We believe that this effect results from coking of the catalyst.

The hypothesis that coking of the Fe/Beta catalyst is responsible for the dramatic reduction of $NO_x$ conversion activity is reinforced by the results shown in FIG. 21, wherein C1 hydrocarbon is detected downstream of the Fe/SSZ-13 catalyst almost immediately after n-octane is introduced into the feed gas at 8 minutes. By comparison, a significantly lower quantity of C1 hydrocarbon is observed in the effluent for the Fe/Beta sample. Since there is significantly less C1 hydrocarbon present in the effluent for the Fe/Beta sample, and the n-octane must have gone somewhere, the results suggest that it has become coked on the Fe/Beta catalyst, contributing to the loss in $NO_x$ conversion activity.

Example 16

Figure 22:
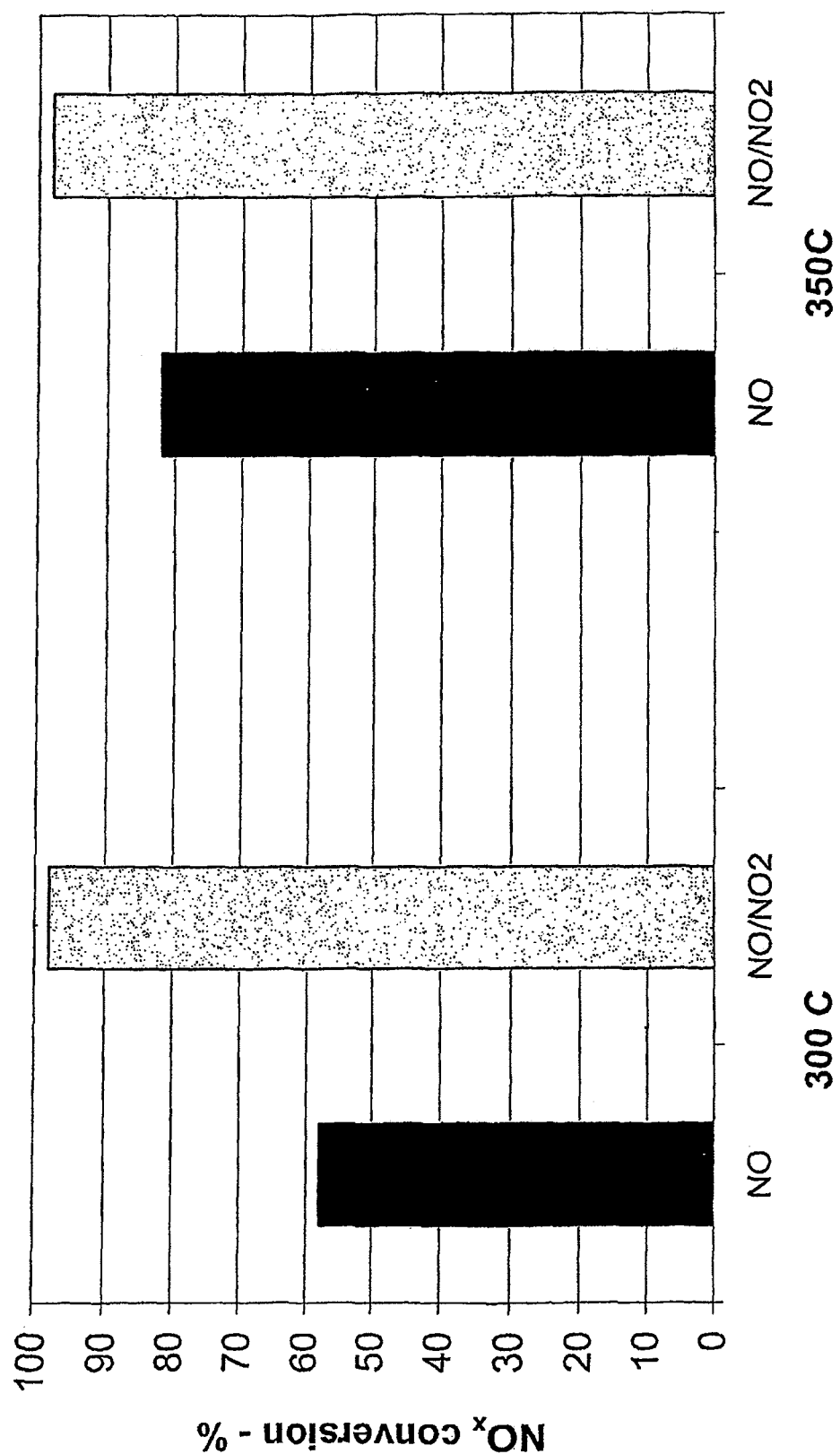
FIG. 22 is a bar chart comparing the effect on $NO_x$ conversion activity for a fresh Fe/SSZ-13 catalyst of using 100% NO as a component of the feed gas with using 1:1 $NO:NO_2$.

Results for Experiments Shown in FIG. 22

Fe/SSZ-13 prepared according to Example 1 was tested fresh, i.e. without ageing, in the manner described in Example 6. The test was then repeated using identical conditions, except in that the 350 ppm NO was replaced with a mixture of 175 ppm NO and 175 ppm $NO_2$, i.e. 350 ppm total $NO_x$. The results from both tests are shown in FIG. 22, from which the significant improvement obtainable from increasing the $NO_2$ content of $NO_x$ in the feed gas to 1:1 can be seen. In practice, the $NO:NO_2$ ratio can be adjusted by oxidising NO in an exhaust gas, e.g. of a diesel engine, using a suitable oxidation catalyst located upstream of the $NH_3$-SCR catalyst.

The invention claimed is:

1. A catalyst comprising at least one small pore aluminosilicate molecular sieve wherein said molecular sieve has a framework type selected from AEI, DDR, LEV, PAU, and UEI, has an SAR of about 8 to about 150, and contains 0.5 to 5 weight percent ion exchanged Cu, the catalyst effective to promote the reaction of NH3 with NOx to form nitrogen and water, selectively.

2. The catalyst of claim 1, wherein said framework type is AEI.

3. The catalyst of claim 2, wherein said molecular sieve SSZ-39.

4. The catalyst of claim 1, wherein said framework type is DDR.

5. The catalyst of claim 4, wherein said molecular sieve is selected from Deca-dodecasil 3R and Sigma-1.

6. The catalyst of claim 1, wherein said framework type is LEV.

7. The catalyst of claim 6, wherein said molecular sieve is selected from Levynite, Nu-3, LZ-132, and ZK-20.

8. The catalyst of claim 1, wherein said framework type is PAU.

9. The catalyst of claim 1, wherein said framework type is UEI.

10. The catalyst of claim 1, wherein said transition metal is an exchanged transition metal.

11. The catalyst of claim 1, wherein said catalyst is in a washcoat.

12. The catalyst of claim 11, wherein said washcoat further comprises a binder selected from the group consisting of alumina, silica, non-zeolite silica-alumina, $TiO_2$, $ZrO_2$, and $SnO_2$.

13. The catalyst of claim 12, wherein said washcoat is disposed in a metal or ceramic flow-through substrate or a ceramic wall-flow filter.

14. The catalyst of claim 1, wherein said catalyst is in a reactive mixture further comprising $NH_3$ and $NO_x$, wherein said mixture has a temperature of 175° C. to 550° C.

* * * * *